(12) United States Patent
Cárdenes Cabré et al.

(10) Patent No.: US 11,816,226 B2
(45) Date of Patent: Nov. 14, 2023

(54) SECURE DATA PROCESSING TRANSACTIONS

(71) Applicant: Via Science, Inc., Somerville, MA (US)

(72) Inventors: Jesús Alejandro Cárdenes Cabré, Montreal (CA); Jeremy Taylor, Montreal (CA); Colin Gounden, Cambridge, MA (US)

(73) Assignee: Via Science, Inc., Somerville, MA (US)

( * ) Notice: Subject to any disclaimer, the term of this patent is extended or adjusted under 35 U.S.C. 154(b) by 999 days.

(21) Appl. No.: 16/362,051

(22) Filed: Mar. 22, 2019

(65) Prior Publication Data

US 2019/0295073 A1 Sep. 26, 2019

Related U.S. Application Data

(60) Provisional application No. 62/646,525, filed on Mar. 22, 2018.

(51) Int. Cl.

| | |
|---|---|
| *G06F 21/60* | (2013.01) |
| *G06F 11/34* | (2006.01) |
| *G06N 3/10* | (2006.01) |
| *G06F 7/58* | (2006.01) |
| *H04L 9/00* | (2022.01) |
| *H04L 9/30* | (2006.01) |
| *G06N 20/10* | (2019.01) |
| *G06Q 20/38* | (2012.01) |
| *G06F 21/62* | (2013.01) |
| *G06N 3/084* | (2023.01) |

(Continued)

(52) U.S. Cl.
CPC ............ *G06F 21/602* (2013.01); *G06F 7/588* (2013.01); *G06F 11/3466* (2013.01); *G06F 21/6245* (2013.01); *G06N 3/044* (2023.01);

*G06N 3/045* (2023.01); *G06N 3/047* (2023.01); *G06N 3/048* (2023.01); *G06N 3/084* (2013.01); *G06N 3/10* (2013.01); *G06N 20/10* (2019.01); *G06Q 20/3823* (2013.01); *G06Q 20/3829* (2013.01); *H04L 9/008* (2013.01); *H04L 9/3066* (2013.01); *G06F 7/58* (2013.01)

(58) Field of Classification Search
CPC .... G06N 20/10; G06N 3/0454; G06N 3/0472; G06N 3/0481; G06N 3/10; G06F 21/602; G06F 7/588; G06F 11/3466; G06F 7/58; G06Q 20/3823; H04L 9/008; H04L 9/3066
USPC .......................................................... 705/64
See application file for complete search history.

(56) References Cited

U.S. PATENT DOCUMENTS

| | | | |
|---|---|---|---|
| 6,941,282 B1 * | 9/2005 | Johnson | |
| 10,223,547 B2 | 3/2019 | Rane et al. | |

(Continued)

OTHER PUBLICATIONS

Chaoyun Zhang et al: "Deep Learning in Mobile and Wireless Networking: A Survey", IEEE Communications Surveys & Tutorials PP(99)—Mar. 2018.

(Continued)

*Primary Examiner* — Neha Patel
*Assistant Examiner* — Yin Y Choi
(74) *Attorney, Agent, or Firm* — PIERCE ATWOOD LLP

(57) ABSTRACT

A request to train a neural-network model is received, as are a first offer to supply encrypted training data and a second offer to train the model. After determining that the offers satisfy the request, a model provider told to train the model. If they model performs in accordance with a quality metric, it is sent to a model user.

18 Claims, 23 Drawing Sheets

(51) Int. Cl.
  *G06N 3/044* (2023.01)
  *G06N 3/045* (2023.01)
  *G06N 3/047* (2023.01)
  *G06N 3/048* (2023.01)

(56) References Cited

U.S. PATENT DOCUMENTS

| | | | |
|---|---|---|---|
| 10,565,498 B1* | 2/2020 | Zhiyanov | |
| 10,699,190 B1* | 6/2020 | Rotem et al. | |
| 10,713,754 B1* | 7/2020 | Wang et al. | |
| 10,747,962 B1* | 8/2020 | Fuerstenau et al. | |
| 2016/0350648 A1 | 12/2016 | Gilad-Bachrach et al. | |
| 2017/0372201 A1 | 12/2017 | Gupta et al. | |
| 2018/0349740 A1 | 12/2018 | Schneider et al. | |
| 2019/0042867 A1 | 2/2019 | Chen et al. | |
| 2019/0095785 A1* | 3/2019 | Sarkar et al. | |
| 2019/0147430 A1* | 5/2019 | Chen et al. | |
| 2019/0173918 A1 | 6/2019 | Sites | |
| 2019/0251441 A1* | 8/2019 | Lu et al. | |
| 2020/0019882 A1* | 1/2020 | Garg et al. | |
| 2020/0076772 A1 | 3/2020 | Kapp et al. | |
| 2020/0082056 A1* | 3/2020 | Hasegawa | |
| 2020/0265315 A1 | 8/2020 | Zoph et al. | |
| 2020/0302292 A1* | 9/2020 | Tseng et al. | |
| 2020/0382278 A1* | 12/2020 | Xu et al. | |
| 2021/0157312 A1 | 5/2021 | Cella et al. | |
| 2021/0165938 A1 | 6/2021 | Bailey et al. | |
| 2021/0168044 A1 | 6/2021 | Ogawa et al. | |
| 2021/0192360 A1* | 6/2021 | Bitauld et al. | |
| 2021/0266145 A1 | 8/2021 | Chen et al. | |
| 2021/0271970 A1 | 9/2021 | Bello et al. | |

OTHER PUBLICATIONS

International Search Report and Written Opinion for PCT/US2019/023650 dated Jul. 10, 2019.
International Preliminary Report on Patentability dated Sep. 22, 2020 in International Application No. PCT/US2019/23650, 8 pages.
U.S. Office Action dated Dec. 10, 2021 in U.S. Appl. No. 16/361,982, filed Mar. 22, 2019, 28 pages.
U.S. Office Action issued in U.S. Appl. No. 17/329,677, filed May 25, 2021, dated Sep. 13, 2021, 19 pages.
U.S. Office Action dated Mar. 29, 2021 in co-pending U.S. Appl. No. 16/362,057, filed Mar. 22, 2019.
Catrina et al., Secure Computation with Fixed-Point Numbers, Financial Cryptography and Data Security, 14th International Conference, Jan. 2010, retrieved from http://citeseerx.ist.psu.edu/viewdoc/download?doi=10.1.1.221.1305&rep=rep1&type=pdf, 16 pages.
Min et al., A Privacy-Preserving Parallel and Homomorphic Encryption Scheme, Open Physics, Apr. 2017, pp. 135-142.
U.S. Office Action dated Aug. 12, 2022 for U.S. Appl. No. 16/362,057, filed Mar. 22, 2019.
Acs et al., "DREAM: DiffeRentially privatE smArt Metering," arXiv preprint, arXiv:1201.2531, Jan. 12, 2012, 29 pages.

* cited by examiner

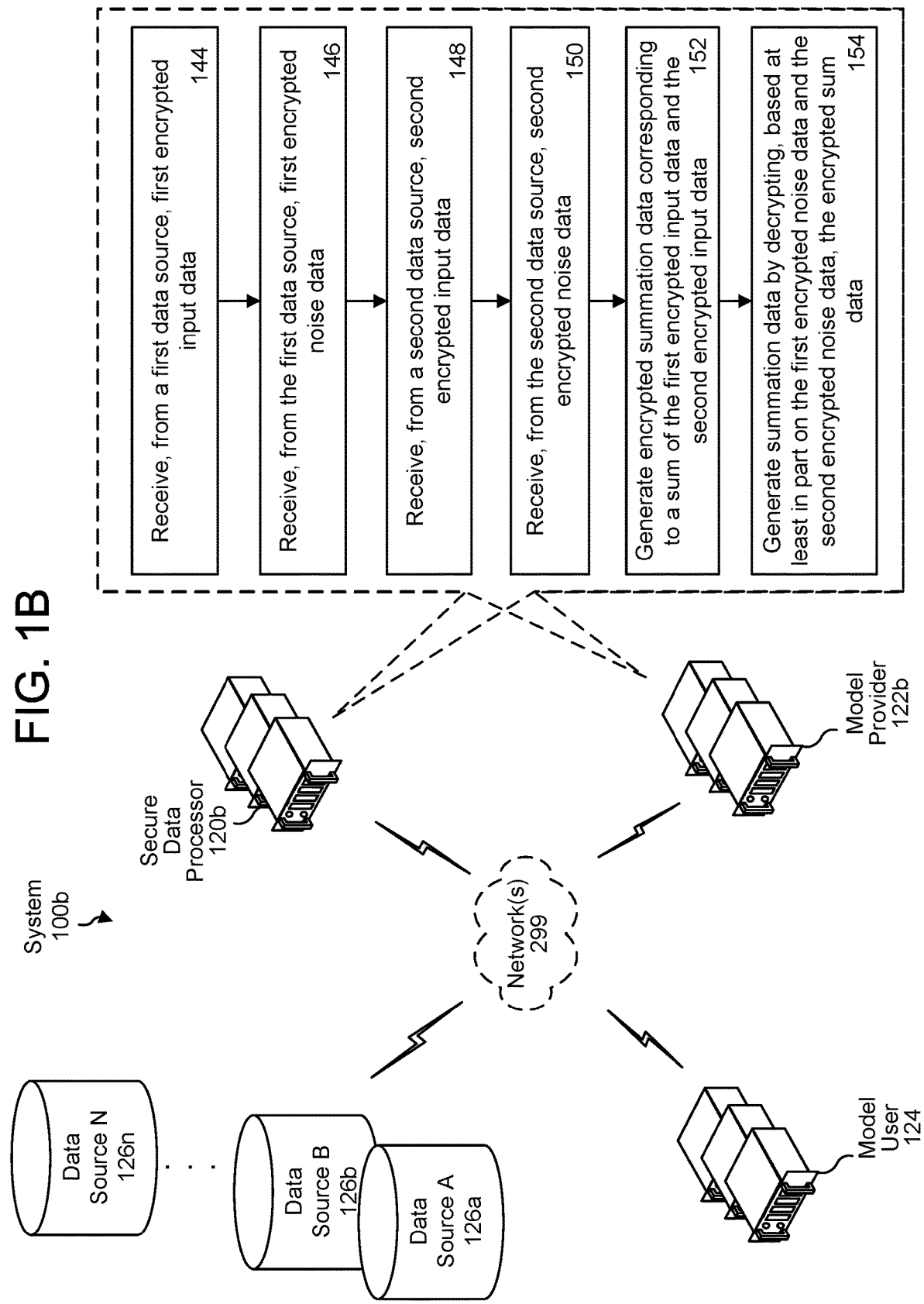

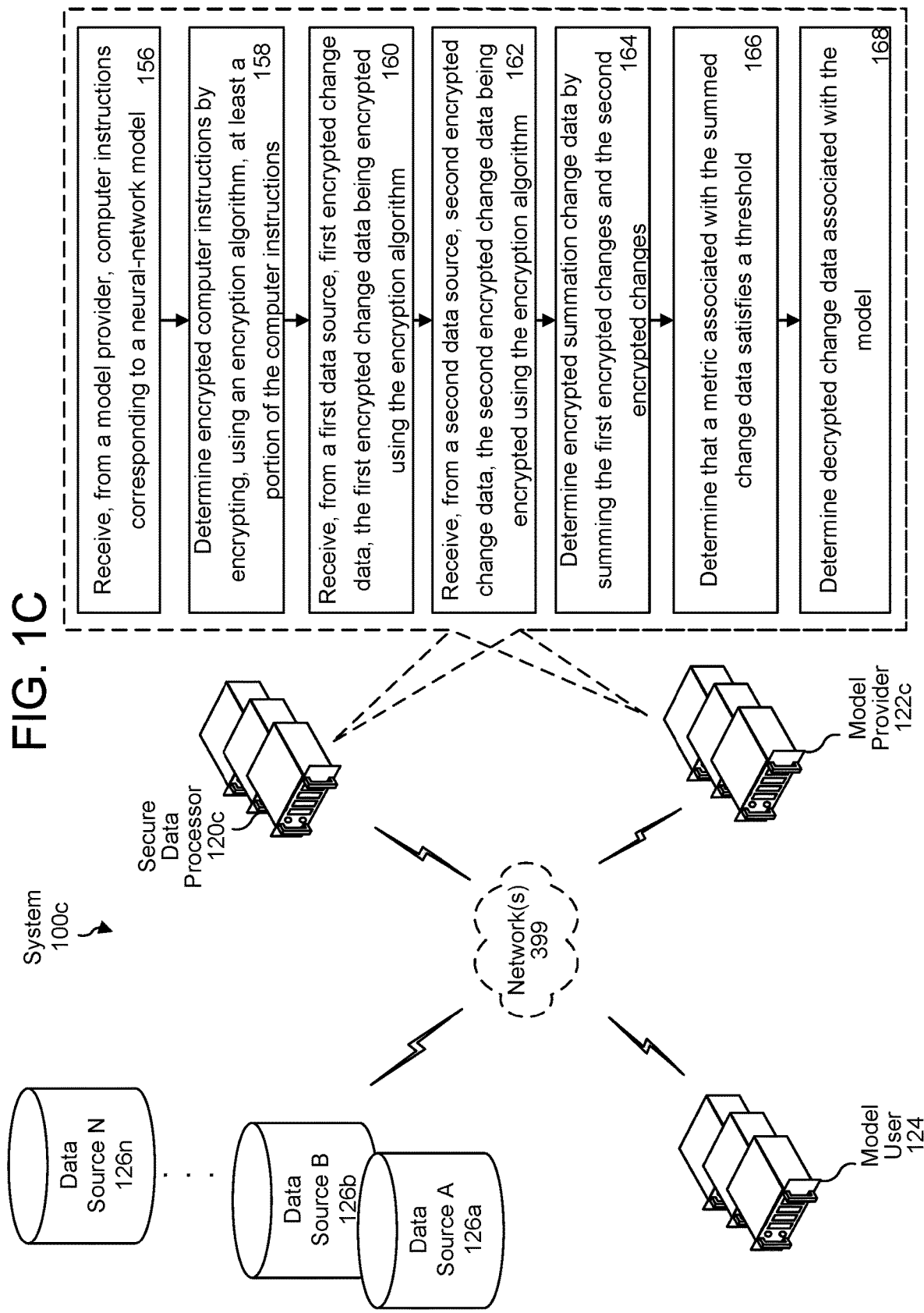

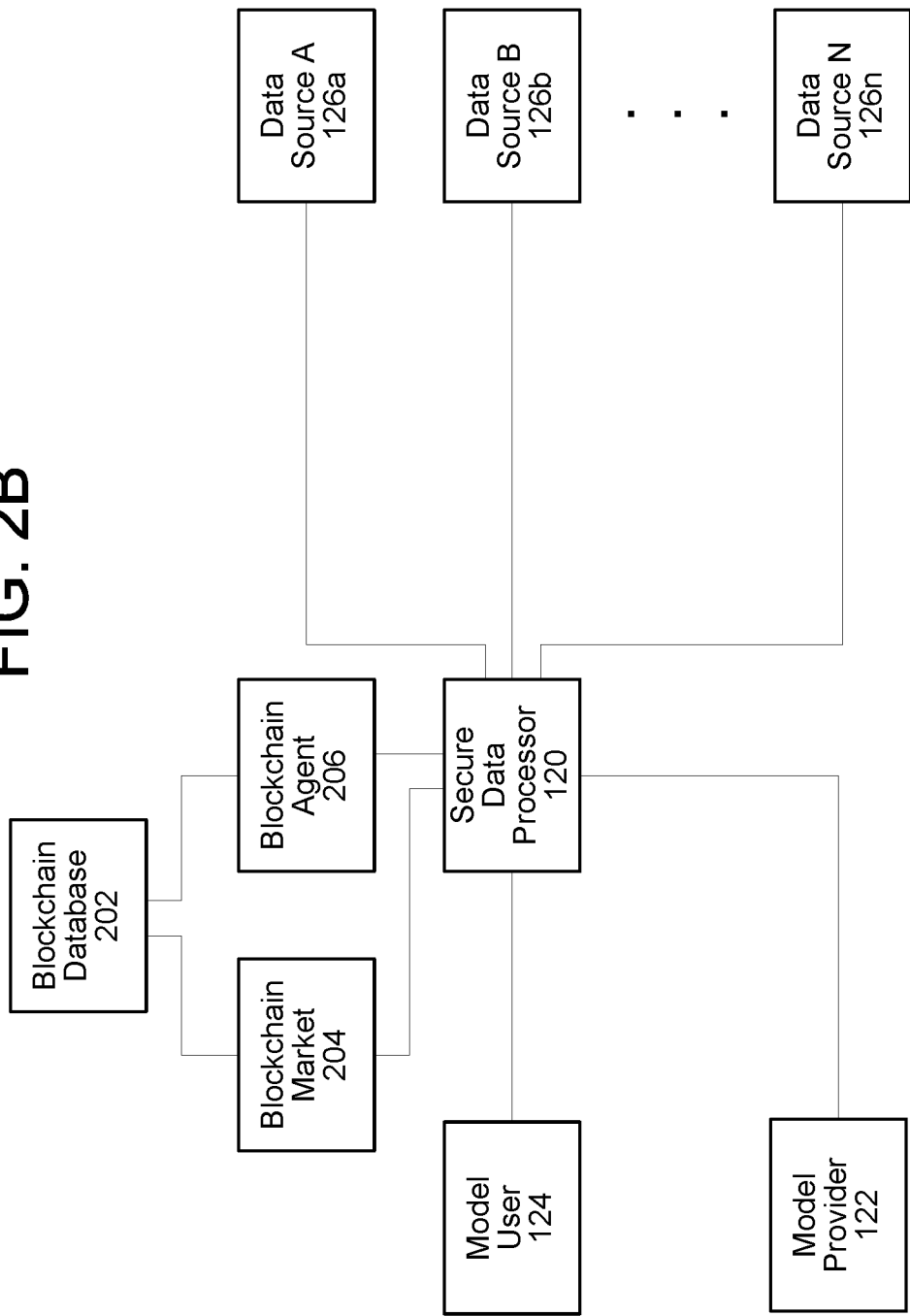

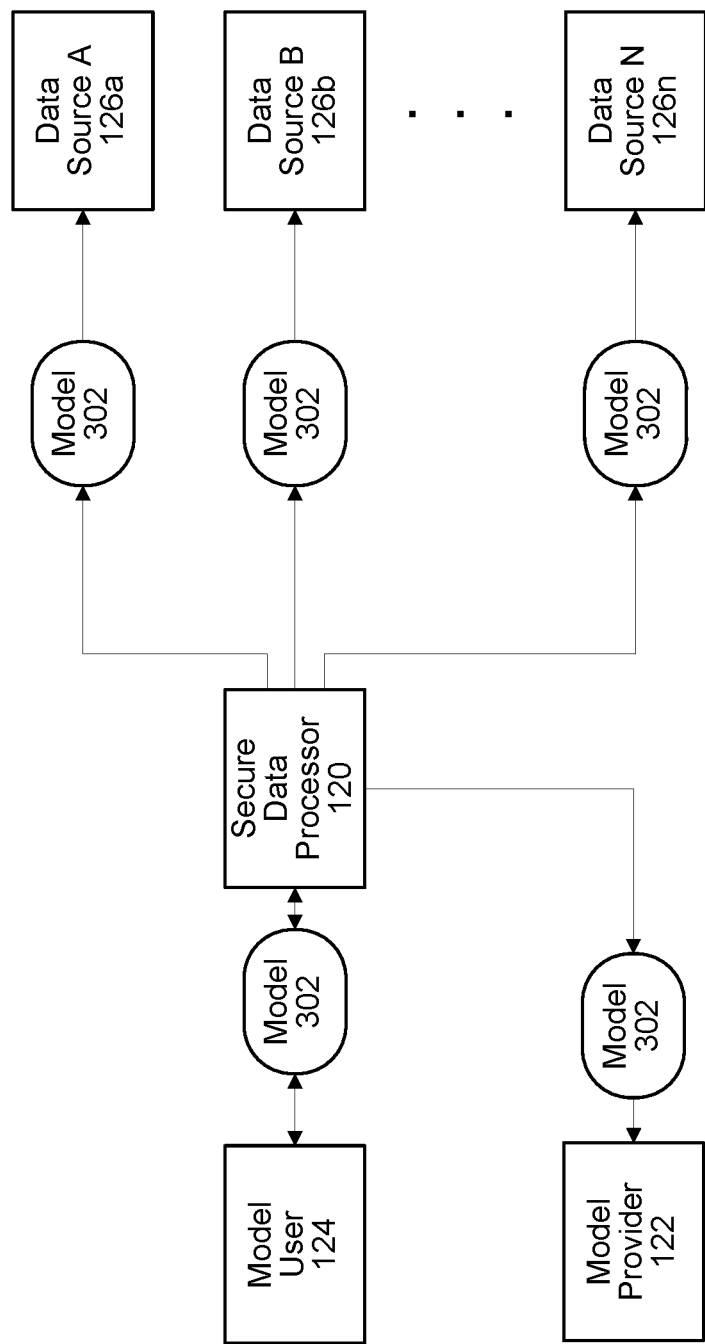

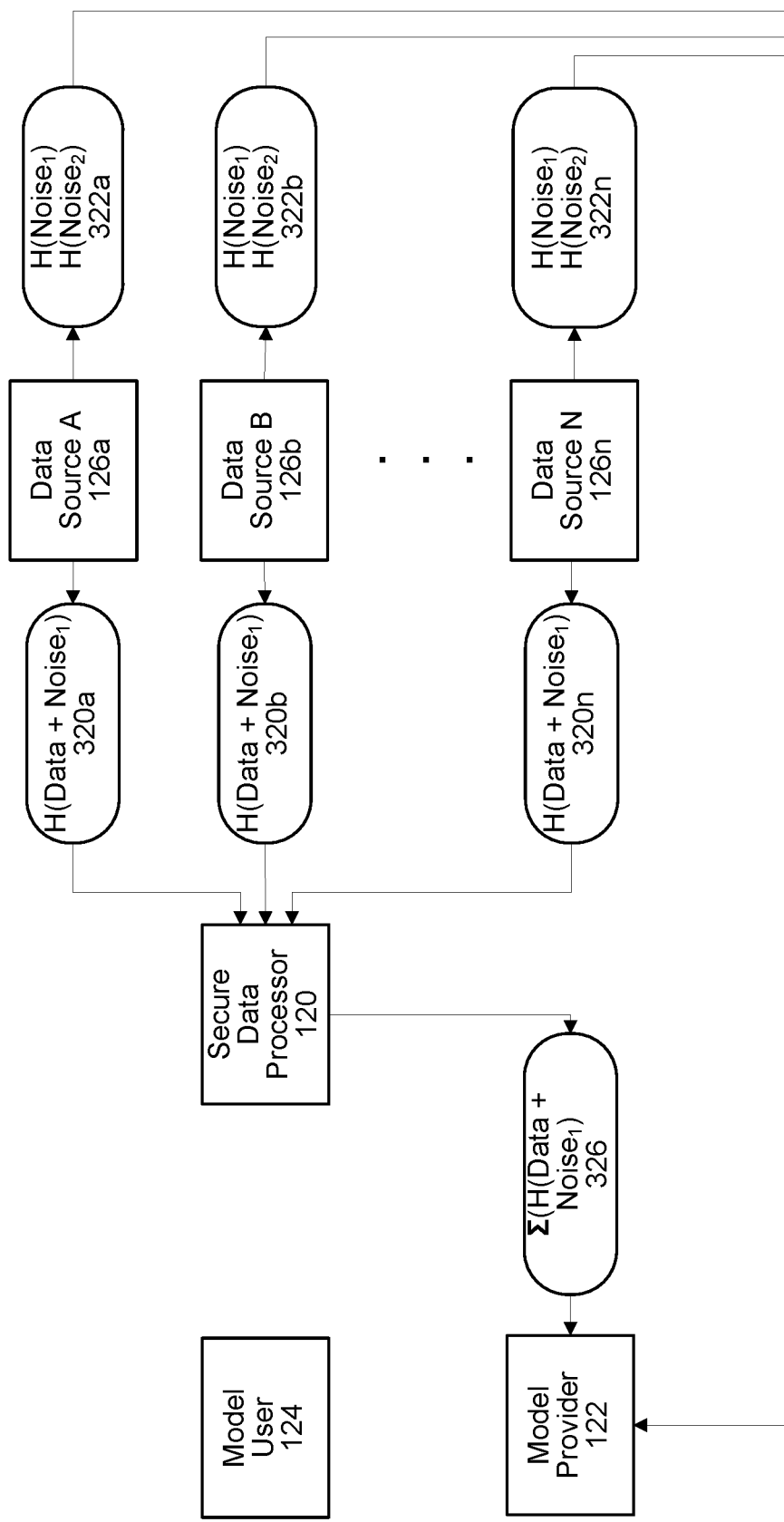

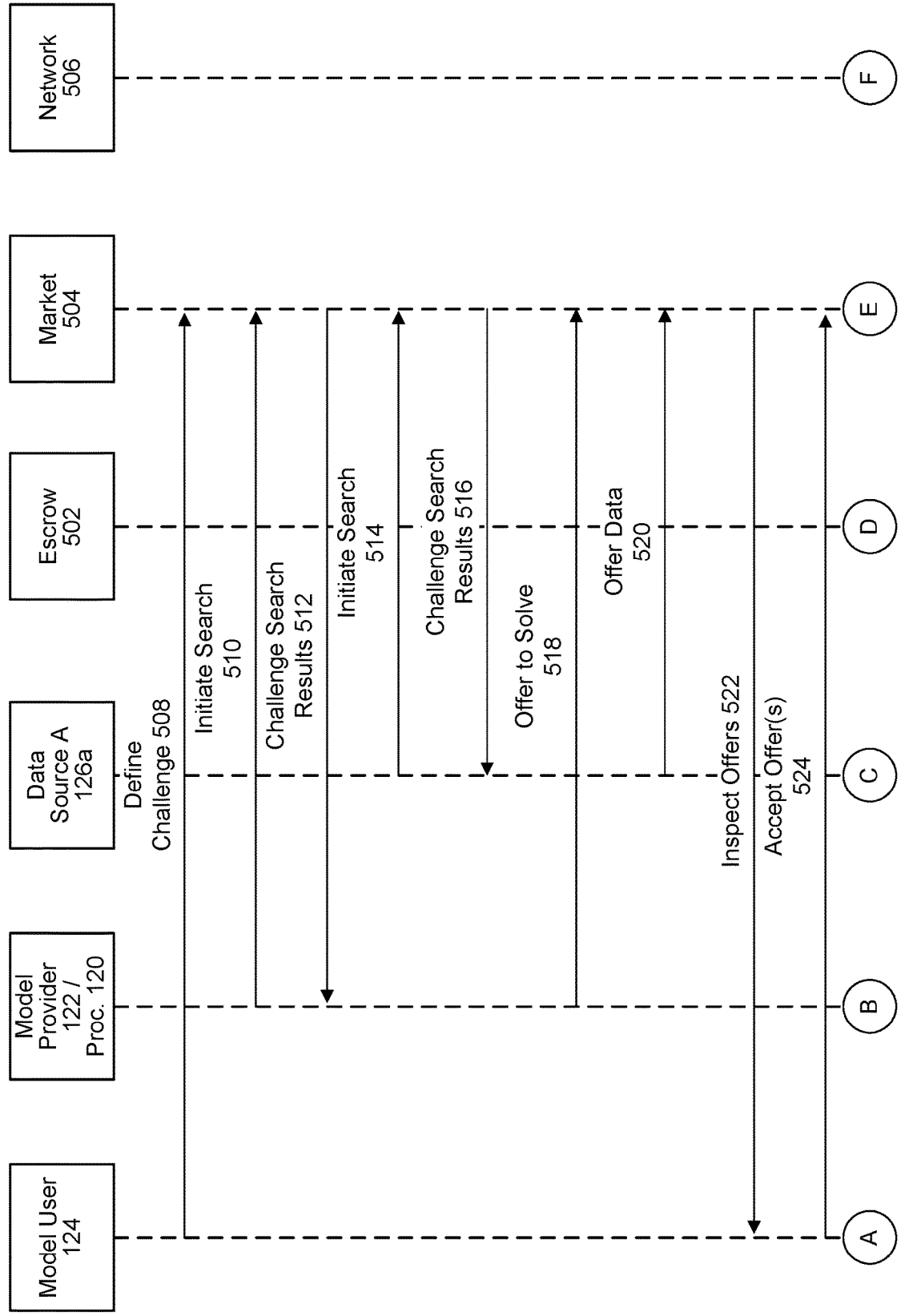

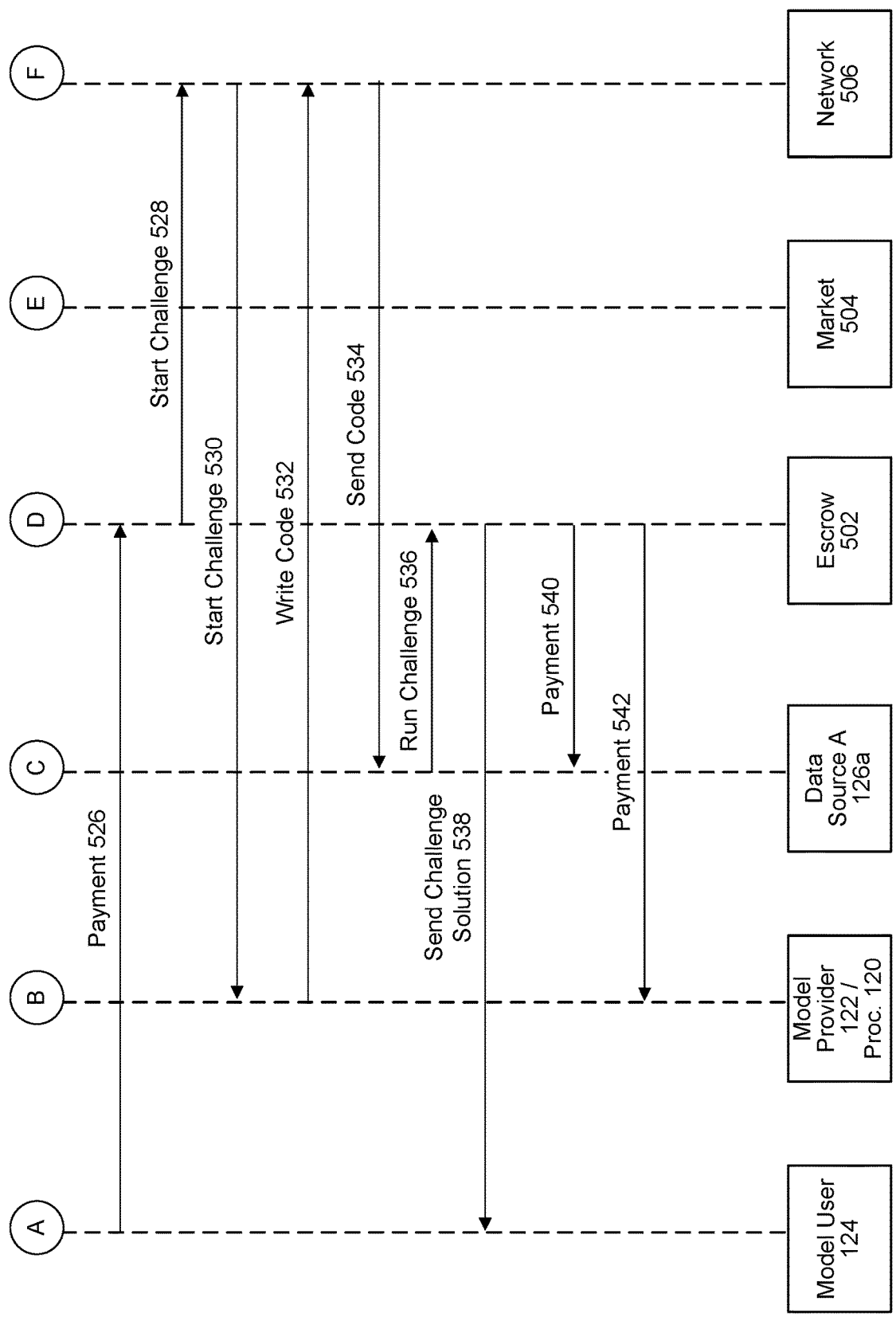

SECURE DATA PROCESSING TRANSACTIONS

CROSS-REFERENCE TO RELATED APPLICATION DATA

This application claims the benefit of and priority to U.S. Provisional Patent Application No. 62/646,525, filed Mar. 22, 2018, and entitled "A SECURE SYSTEM FOR DISTRIBUTED DATA ANALYSIS," in the names of Jeremy Taylor, et al. The above provisional application is herein incorporated by reference in its entirety.

BACKGROUND

Data security and encryption is a branch of computer science that relates to protecting information from disclosure to third parties and allowing only an intended party or parties access to that information. The data may be encrypted using various techniques, such as public/private key cryptography, and may be decrypted by the intended recipient using a shared public key and a private key. Transmission of the data is protected from being decrypted by third parties at least by their lack of possession of the private key.

BRIEF DESCRIPTION OF DRAWINGS

For a more complete understanding of the present disclosure, reference is now made to the following description taken in conjunction with the accompanying drawings.

FIGS. 1A and 1B illustrate systems configured to securely process data according to embodiments of the present disclosure.

FIG. 1C illustrates a system configured to securely train a neural-network model according to embodiments of the present disclosure.

FIGS. 2A and 2B illustrate computing environments including a secure data processor according to embodiments of the present disclosure.

FIGS. 3A-3H illustrate data transfers using computing environments that include a secure data processor according to embodiments of the present disclosure.

FIGS. 5A and 5B illustrate a flow diagram for transacting to build a neural network according to embodiments of the present disclosure.

SUMMARY

Figure 1A:
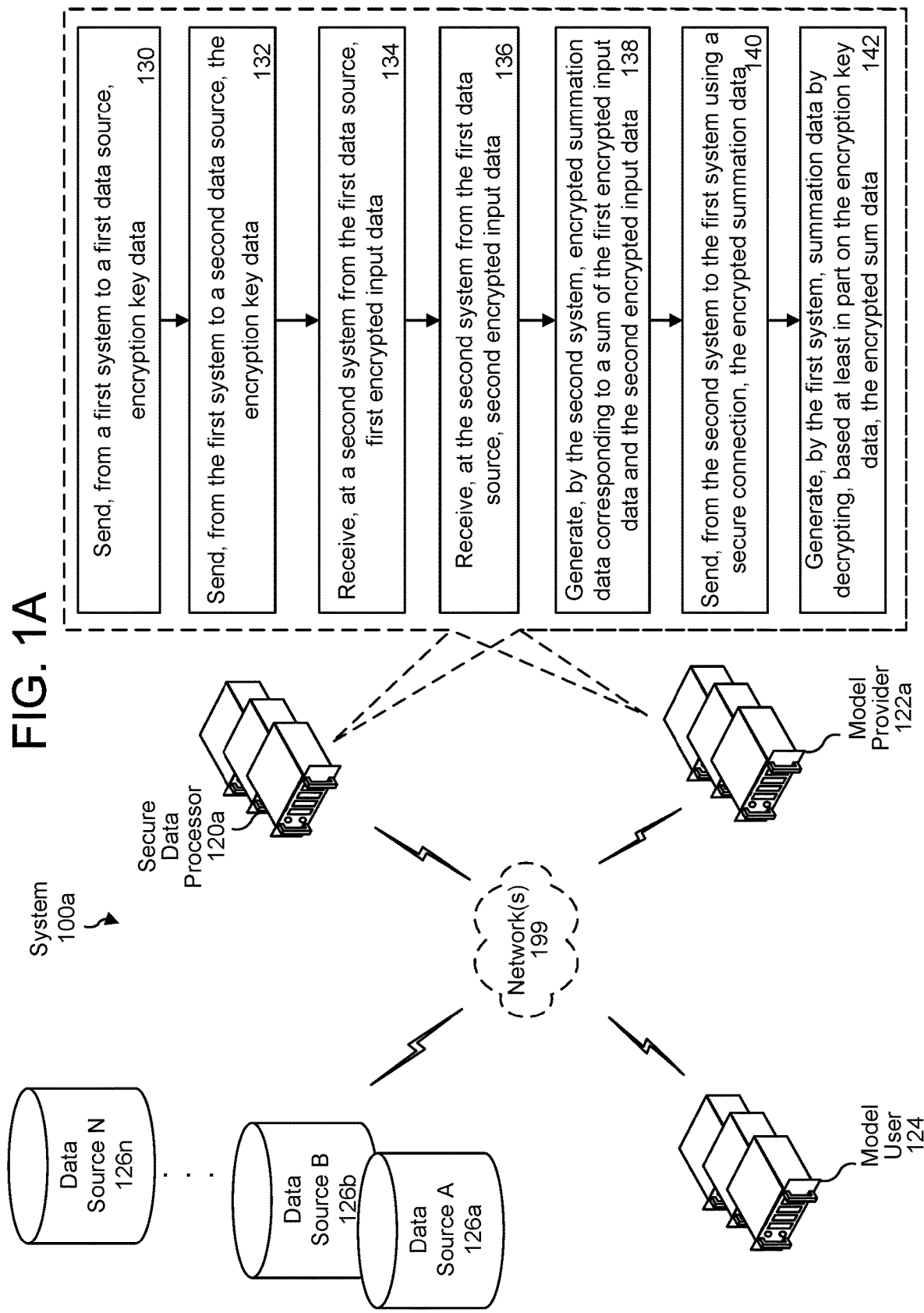

In various embodiments of the present disclosure, a first party that owns proprietary data permits a second party to realize a benefit from the data without actually having to transfer the data; the first party shares only an encrypted version of the data. In some embodiments, a secure data processor is disposed between the first and second parties on a computer network; two or more data sources send encrypted versions of their data to the secure data processor, which adds them together and sends the result to the second party. The secure data processor cannot decrypt the data because it lacks the necessary keys, and the second party can decrypt only the sum of the data, not the original data.

In some embodiments, multiple data sources encrypt data using encryption key data received from a first system; a second system does not have access to the encryption key data. The second system receives the encrypted data from the multiple data sources. Because the encryption is additively homomorphic, the second system may create encrypted summation data using the encrypted data. The second system may send the encrypted summation data to the first system, which may then decrypt the encrypted summation data to create unencrypted summation data.

In other embodiments, the data source may include noise with the data. A first system creates and sends encryption key data to multiple data sources. A second system receives data encrypted using the encryption key data from the multiple data sources; the data may include noise data such that, even if decrypted, the original data cannot be discovered. Because the encryption is additively homomorphic, the second system may create encrypted summation data using the encrypted data. The first system separately receives the noise data encrypted using the same technique as the encrypted data. The second system may send the encrypted summation data to the first system, which may then remove the noise data from the encrypted summation data to create unencrypted summation data.

In other embodiments, a neural-network model may be securely trained. Computer instructions corresponding to a neural-network model are received and encrypted using an encryption technique. The model is trained using the training data using, for example, a gradient descent technique, and gradient data encrypted using the encryption technique is received from a data source. If the model performs in accordance with a quality metric, it is sent to a device of a model user.

In still other embodiments, a marketplace may be configured to request building the model and to offer to build the model. A request to train a neural-network model is received, as are a first offer to supply encrypted training data and a second offer to train the model. After determining that the offers satisfy the request, a model provider told to train the model. If they model performs in accordance with a quality metric, it is sent to a model user

DETAILED DESCRIPTION

Machine-learning systems, such as those that use neural networks, may be trained using training data and then used to make predictions on out-of-sample (i.e., non-training) data. A power company, for example, may collect data regarding a failure likelihood of a particular component; this data may include, for example, temperature, vibration, and voltage data collected during use of the component. The power company may then annotate this data to indicate times at which the component failed. Using this collected and annotated data, the power company may train a neural network to predict when the component will fail based on the already-known times of failure. Once built, the power company may deploy the model to attempt to receive additional data collected from the component and make failure predictions for currently operating components using this out-of-sample data.

The training data may, however, be insufficient in size and/or quality to train a model that predicts component failures with an acceptable accuracy. The power company may improve their model by training it with additional training data, but this additional training data may not be accessible to the power company. A rival power company, for example, may possess some additional training data, but may be reluctant to provide their proprietary intellectual property to a competitor. In other industries or situations, data owners may further be predisposed to not share their data because the data set is too large to manage or because it is in a different format from other data. In still other industries, data owners may be prohibited to share data, such as medical data, due to state laws and/or regulations. A data owner may further be predisposed to not share data, especially publicly, because any further monetary value in the sharing of the data is lost after sharing the data once.

Embodiments of the present disclosure thus relate to systems and methods for securely processing data, such as the training data described above, collected from one or more data sources. The data sources encrypt their data in accordance with the methods described herein; the data sources may add noise to their data to further protect it. The data sources may send their encrypted, noisy data to a secure data processor, which may add each bit of encrypted, noisy data together to create a sum. Either the secure data processor itself, or another system designed to create a model, receives encrypted noise from the data sources. Using the sum of the encrypted, noisy data and the encrypted noisy data, the secure data processor and/or other system removes the noise to create a sum of the data; this sum may be used to train a model that may be of benefit to the one or more data sources (and/or other users of the model). In some embodiments, the data sources encrypt their data in accordance with a set of domain parameters corresponding to an encryption technique, such as Rivest-Shamir-Adleman (RSA) encryption, Advanced Encryption Standard (AES) encryption, or elliptic-curve encryption; in these embodiments, the data source may send only their encrypted data and may not send the encrypted noise data. A marketplace may be configured to facilitate transactions between the data sources and other systems. The data sources thus may benefit financially, or by use of the trained model, without divulging their training data to any other party.

FIGS. 1A-1D show systems that include a secure data processor 120 and a network 199. The network 199 may include the Internet and/or any other wide- or local-area network, and may include wired, wireless, and/or cellular network hardware. The secure data processor 120 may communicate, via the network 199, with one or more model providers 122, model users 124, and/or data sources 126. The secure data processor 120 may transmit, via the network 199, requests to the other systems using one or more application programming interfaces (APIs). Each API may correspond to a particular application. A particular application may, for example, be operated within the secure data processor 120 or may be operating using one or more of the other systems.

Referring first to FIG. 1A, in accordance with the present disclosure, a system 100a includes a secure data processor 120a, a model provider 122a, a model user 124, and one or more data sources 126. The model provider 122a sends (130), to a first data source, encryption key data. The model provider 122a also sends (132) to a second data source, the encryption key data. The secure data processor 120a receives (134), from the first data source, first encrypted input data, the first encrypted input data being encrypted based at least in part on the encryption key data. The secure data processor 120a receives (136), from the first data source, second encrypted input data, the second encrypted input data being encrypted based at least in part on the encryption key data. The secure data processor 120a generates (138), encrypted summation data corresponding to a sum of the first encrypted input data and the second encrypted input data, wherein the secure data processor 120 is not in possession of the encryption key data. The secure data processor 120a sends (140), to the other of the model provider 122a, using a secure connection, the encrypted summation data. The model provider 122a generates (142) summation data by decrypting, based at least in part on the encryption key data, the encrypted sum data Referring to FIG. 1B, in accordance with the present disclosure, a system 100b includes a secure data processor 120, a model provider 122, a model user 124, and one or more data sources 126. The secure data processor 120b and/or model provider 122b receives (144), from a first data source, first encrypted input data. The secure data processor 120b and/or model provider 122b receives (146), from the first data source, first encrypted noise data. The secure data processor 120b and/or model provider 122b receives (148), from a second data source, second encrypted input data. The secure data processor 120b and/or model provider 122b receives (150), from the second data source, second encrypted noise data. The secure data processor 120b and/or model provider 122b generates (152) encrypted summation data corresponding to a sum of the first encrypted input data and the second encrypted input data. The secure data processor 120b and/or model provider 122b generates (154) summation data by decrypting, based at least in part on the first encrypted noise data and the second encrypted noise data, the encrypted sum data.

Referring to FIG. 1C, in accordance with the present disclosure, a system 100c includes a secure data processor 120c, a model provider 122c, a model user 124, and one or more data sources 126. The secure data processor 120c (and/or other system) receives (156), from a model provider, computer instructions corresponding to a neural-network model. The secure data processor 120c determines (158) encrypted computer instructions by encrypting, using an encryption technique, at least a portion of the computer instructions. The secure data processor 120c receives (160), from a first data source, first encrypted change data corresponding to weights of the model, the first encrypted change data being encrypted using the encryption technique. The secure data processor 120c receives (162), from a second data source, second encrypted change data, the second encrypted change data being encrypted using the encryption technique. The secure data processor 120c determines (164) an encrypted summation change data by summing the first encrypted changes data and the second encrypted change data. The secure data processor 120c determines (166) that a metric associated with the changes satisfies a threshold and determines (168) decrypted change data.

Figure 1D:
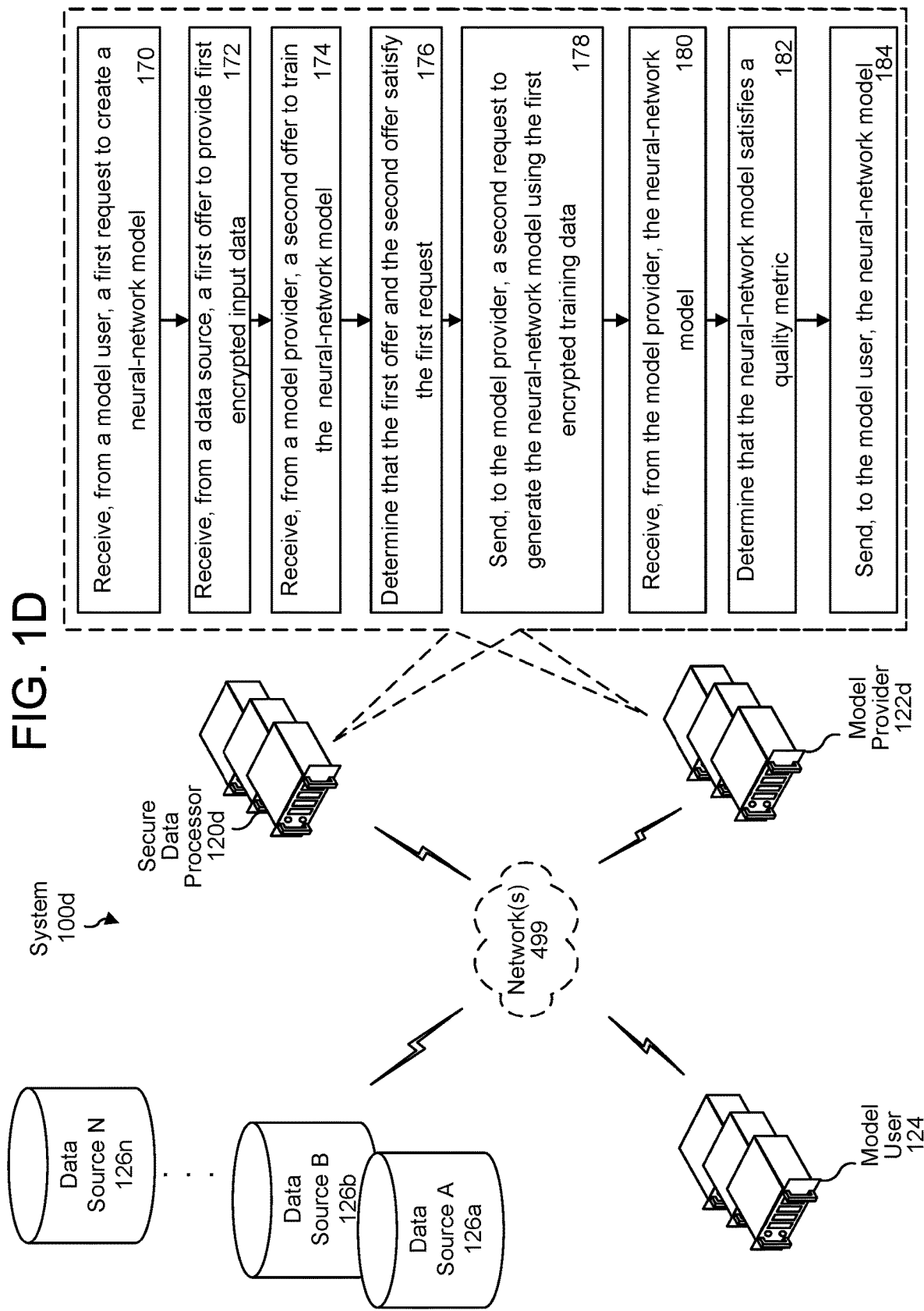
FIG. 1D illustrates a system configured to conduct transactions related to securely training a neural-network model according to embodiments of the present disclosure.

Referring to FIG. 1D, in accordance with the present disclosure, a system 100d includes a secure data processor 120, a model provider 122, a model user 124, and one or more data sources 126. The secure data processor 120d (and/or other system) receives (170), from a model user, a first request to provide a trained neural-network model. The secure data processor 120d receives (172), from a data source, a first offer to provide first encrypted input data. The secure data processor 120*d* receives (174), from a model provider 122*d*, a second offer to train a first neural-network model. The secure data processor 120*d* determines (176) that the first offer and the second offer satisfy the first request. The secure data processor 120*d* sends (178), to the model provider 122*d*, a second request to train a second neural-network model using the first neural-network model and the first encrypted training data. The secure data processor 120*d* receives (180), from the model provider 122*d*, the second neural-network model. The secure data processor 120*d* determines (182) that the second neural-network model satisfies a quality metric and, based thereon, sends (184), to the model user 124, the second neural-network model.

Figure 2A:
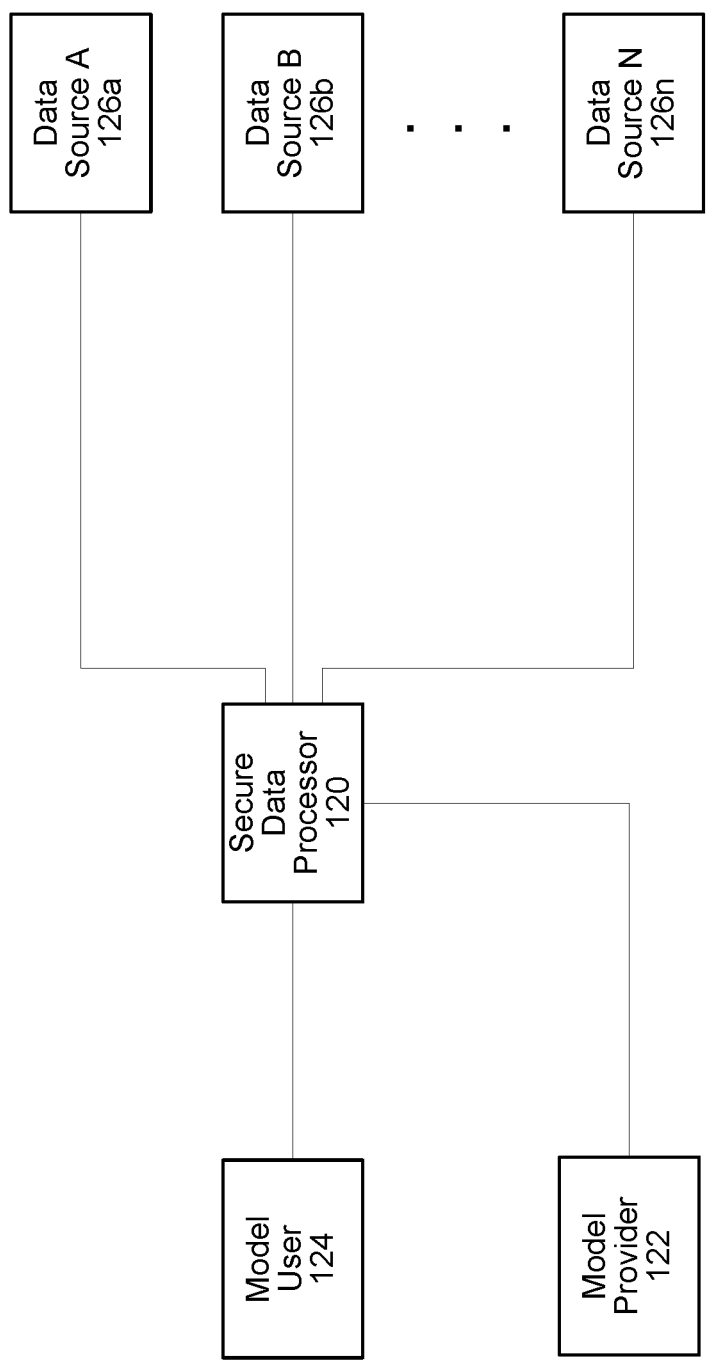

FIGS. 2A and 2B illustrate computing environments including a secure data processor 120 according to embodiments of the present disclosure. A secure data processor 120, described in greater detail below, may be one or more servers configured to receive encrypted data from one or more data sources 126. A model provider 122 may provide and/or train a model, such as a neural-network machine-learning model, configured to process the data from the data sources 126. The secure data processor 120 and/or the model provider 122 may train the model using the data from the data sources 126 by, for example, computing weights of the machine-learning model using, for example, stochastic gradient descent. Once the secure data processor 120 and/or model provider 122 trains the model the model in accordance with one or more metrics, it may send the trained model and/or associated weights to one or more model users 124. In some embodiments, a model user 124 is also a data source 126.

Although the secure data processor 120, the model provider 122, model user 124, and data sources 126 are illustrated as separate systems, in some embodiments, one or more of the secure data processor 120, the model provider 122, model user 124, and data sources 126 may be the same system. For example, the model provider 122 may also be the model user 124. One or more of the data sources 126 may be the model user 124. The present disclosure is thus not limited to the example environment illustrated in FIG. 2A.

FIG. 2B illustrates a computing environment that includes a blockchain database 202. The blockchain database 202 may use blockchain technology, as one of skill in the art will understand, to maintain a public ledger of information, such as data transmitted using the secure data processor 120. The secure data processor may not communicate directly with the blockchain database 202; instead, it may communicate using a blockchain market 204 and/or a blockchain agent 206.

The blockchain market 204 may include pointers to data in one or more data sources 126 and may allow access to that data. The blockchain market 204 may further contain information related to one more self-performing contracts (i.e., "smart" contracts) relating to data processes or transmitted by the secure data processor 120. The blockchain agent 206, which may be referred to as an "oracle," may monitor the blockchain database 202 for information and/or changes to information therein, and may transmit data relating to those changes to the secure data processor 120.

Figure 3B:
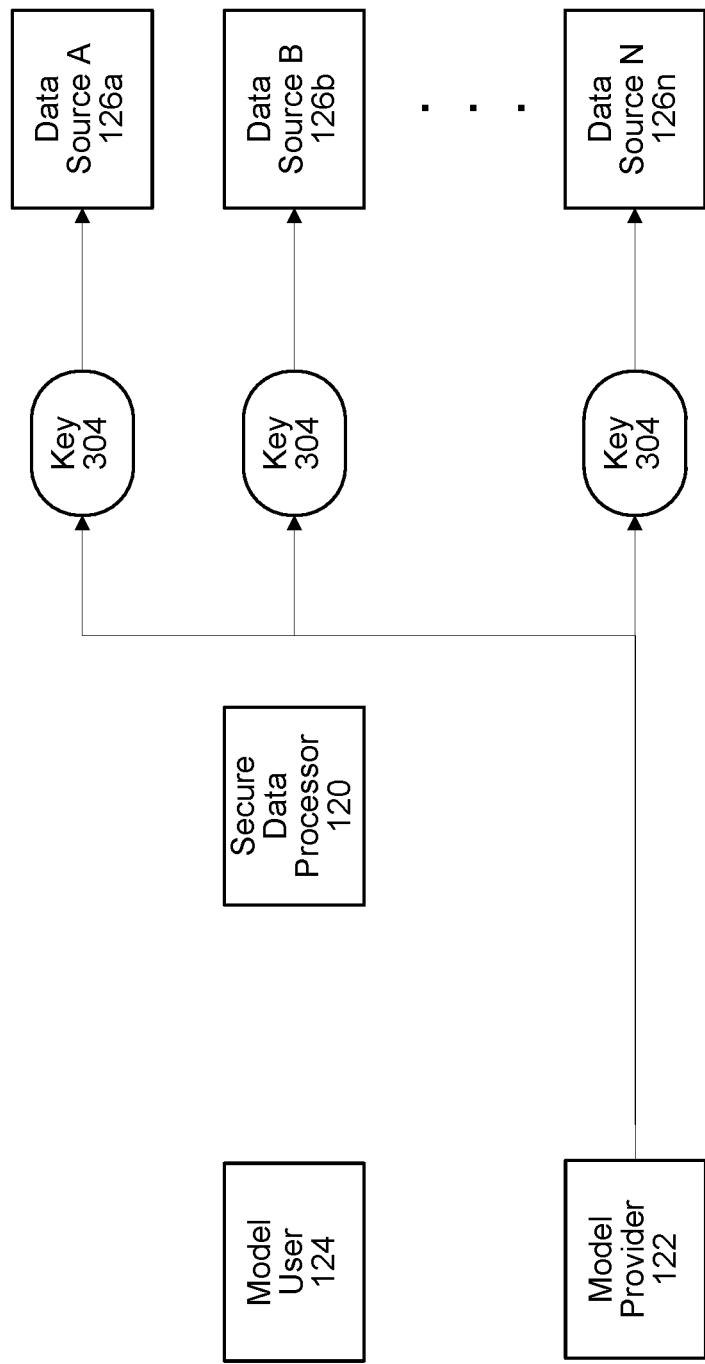

FIGS. 3A-3F illustrate data transfers using computing environments that include a secure data processor 120 according to embodiments of the present disclosure. Referring first to FIG. 3A, the model provider 122 sends a model 302 to the secure data processor 120. The model 302 may be, as explained herein, a neural-network model. The secure data processor 120 may send the model 302 to one or more data sources 126 and, once the model is trained, to the model user 124.

In FIGS. 3A and 3B, in various embodiments, the model provider 122 creates and transmits encryption key data including at least one or more keys 304. The creator of the encryption key data may correspond to an entity trusted to learn the sum of, but not the individual values of, data owned by data sources 126. In some embodiments, as described in further detail below, the secure data processor 120 is trusted to learn only the encrypted sum of the data owned by the data sources 126 and is not trusted to learn the unencrypted sum of the data. The secure data processor 120 may then send this encrypted sum to the model provider 122, which may determine the unencrypted sum. In these embodiments, as shown in FIG. 3B, the model provider 122 creates and distributes the encryption key data.

The encryption key data may include a modulus n, an exponent e, and/or an element a (as explained in greater detail below). The model provider 122 may determine the modulus n by multiplying two prime numbers p and q. The prime numbers may, in some embodiments, be Sophie Germain prime numbers and may be, for example, approximately 1024 bits in size, and the modulus n may be approximately 2048 bits in size. The prime numbers p and q may be defined using the below equations (1) and (2).

$$p=2p'+1 \tag{1}$$

$$q=2q'+1 \tag{2}$$

The numbers p' and q' may also be prime numbers. The model provider 122 may further compute the public modulus n in accordance with the below equation (3). The public modulus n may, as explained in greater detail below, be sent to and used by a data source 126.

$$n=pq \tag{3}$$

The model provider 122 may further compute a function used to select the exponent e that may further be sent to and used by a data source 126. In some embodiments, this function is a Carmichael's totient function $\lambda(n)$, which may be determined in accordance with the below equation (4), in which $lcm(x,y)$ finds the least common multiple of x and y.

$$\lambda(n)=lcm(p-1,q-1) \tag{4}$$

Using equations (1) and (2), equation (4) may be expressed as the below equation (5).

$$\lambda(n)=2p'q' \tag{5}$$

The value of $\lambda(n)$ may be at least 2046 bits in size. The public exponent e may then be determined using the below equation (6), in which $gcd(x,y)$ finds the greatest common denominator of x and y.

$$gcd(\lambda(n),e)=1 \tag{6}$$

The model provider 122 may further determine the modular multiplicative inverse d of e in accordance with the below equation (7), in which mod x computes the modulus of x.

$$d=e^{-1} \bmod \lambda(n) \tag{7}$$

The model provider 122 may then select an element a of maximum order in a multiplicative group $\mathbb{Z}_n^*$, wherein the maximum order of the multiplicative group $\mathbb{Z}_n^*$ is 2p'q', in accordance with known methods of finding an element of maximum order. In some embodiments, the model provider 122 finds a first generator $g_1$ of $\mathbb{Z}_p^*$ in which n=p−1, finds a second generator $g_2$ of $\mathbb{Z}_q^*$ in which n=q−1, and then uses Gauss's Algorithm to find the element a such that $a \equiv g_1 \pmod{p}$ and $a \equiv g_2 \pmod{q}$ and such that $1 \leq a \leq n-1$. The generators may be found by choosing a random element of the multiplicative group $\mathbb{Z}_n^*$, computing b in accordance with the below equation (8), and determining if b is equal to one. If b is equal to one, another random element is chosen and b is again computed. If b is not equal to one, b is selected as the element a.

$$b \leftarrow \alpha^{n/pi} \quad (8)$$

Gauss's Algorithm may be used to find a in accordance with the below equations (9), (10), and (11).

$$a = \Sigma_{i=1}^{k} a_i N_i M_i \bmod(n) \quad (9)$$

In the above equation (9), $N_i$ may be determined in accordance with the below equation (10).

$$N_i = \frac{n}{n_i} \quad (10)$$

$M_i$ may be determined in accordance with the below equation (11).

$$M_i = N_i^{-1} \bmod(n_i) \quad (11)$$

The model provider 122 may further send the element a to the data sources 126, which may further use the element a to encrypt data as explained in greater detail below. The model provider 122 may, however, keep the multiplicative inverse d secret.

The data sources 126 may encrypt data in accordance with an encryption function H(m). In some embodiments, the encryption function H(m) is defined using the below equation (12), in which m is less than the value of the Carmichael's totient function $\lambda(n)$.

$$H(m) = a^{me} \pmod{n} \quad (12)$$

The model provider 122 may decrypt data in accordance with a decryption function $H^{-1}(c)$. In some embodiments, the decryption function $H^{-1}(c)$ is defined using the below equation (13), in which $\log_a$ is the discrete logarithm function over base a. The algorithm function $\log_a$ may be computed by using, for example, a "baby-step giant-step" algorithm.

$$H^{-1}(c) = \log_a(c^d) \pmod{n} \quad (13)$$

In various embodiments, data encrypted using the encryption function H(m) is additively homomorphic such that $H(m_1 + m_2)$ may be determined in accordance with the below equations (14) and (15).

$$H(m_1 + m_2) = a^{(m_1 + m_2)e} \pmod{n} \quad (14)$$

$$H(m_1 + m_2) = a^{m_1 e} a^{m_2 e} \pmod{n} \quad (15)$$

In some embodiments, the above equations (14) and (15) may be computed or approximated by multiplying H(m1) and H(m2) in accordance with the below equation (16).

$$H(m_1 + m_2) = H(m_1) H(m_2) \quad (16)$$

The secure data processor 120 may thus, given two items of encrypted data $H(m_1)$ and $H(m_2)$, determine $H(m_1 + m_2)$ without first applying the decryption function $H^{-1}(c)$. In some embodiments, the value of m is 32 bits in size.

Figure 3C:
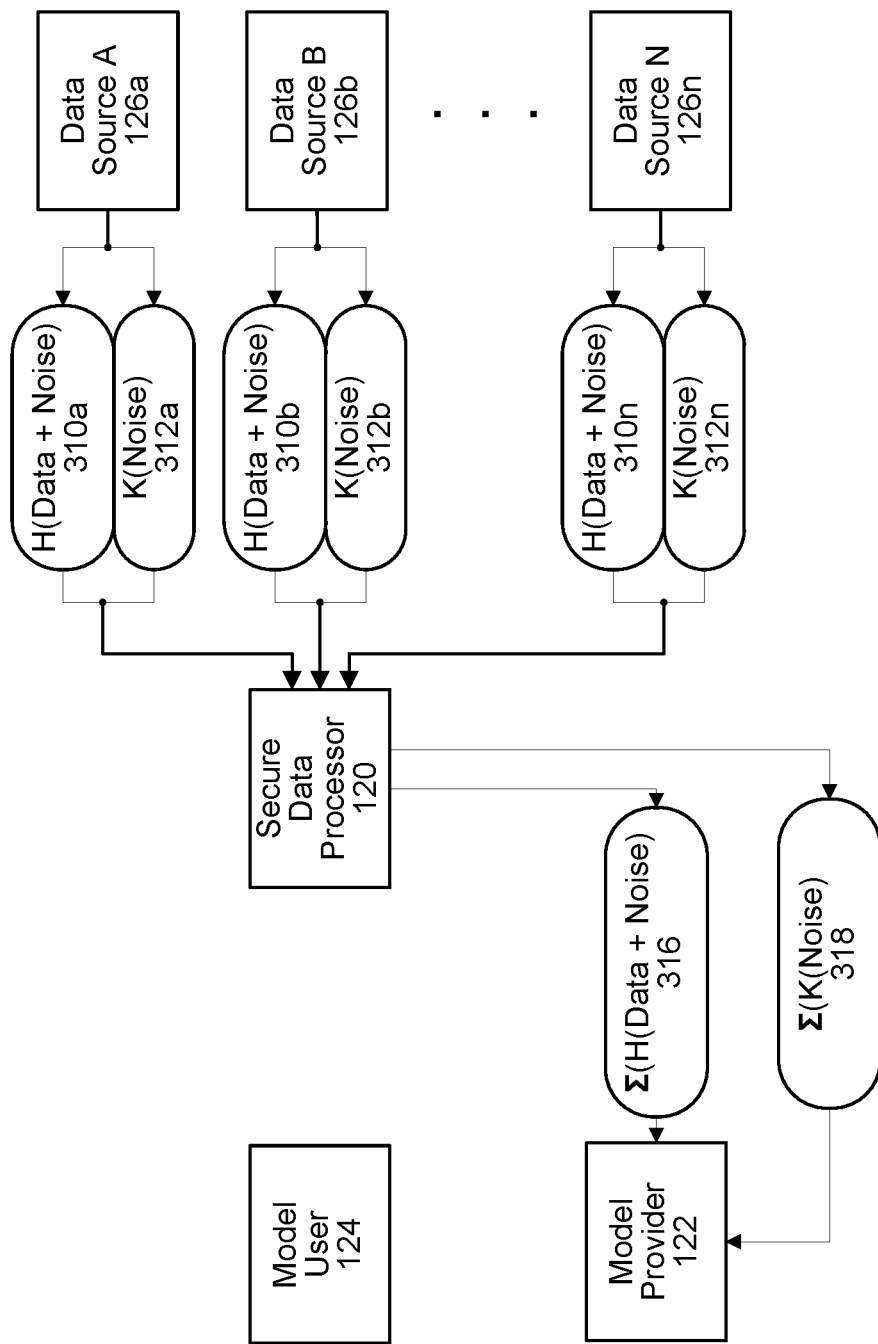

Referring to FIG. 3C, the data sources 126 may encrypt data plus noise $(v_i + \eta_i)$ in accordance with a first encryption function H(m), as described above, and may encrypt noise $(\eta_i)$ in accordance with a second encryption function K(m).

In some embodiments, the model provider 122 creates the second encryption function K(m) using the above-described process of creating the first encryption function H(m). The second encryption function K(m) may, however, use a different set of keys, including but not limited to a different public key, which it may receive from the model provider 122. The data source 126 may encrypt $(v_i + \eta_i)$ using one encryption function (for example, H(m)) and may encrypt $(\eta_i)$ using a different encryption function (for example, K(m)). A data source 126 may determine a value $v_i$ that it wishes to make available for training of the model 302 without allowing knowledge of the actual value of $v_i$ to be possessed by the secure data processor 120, model provider 122, and/or model user 124. The value $v_i$ may be 32 bits in size.

The data source 126 selects the random noise value $\eta_i$ using, for example, a random noise generator. The noise value $\eta_i$ may be 368 bits in size. Using the above encryption function H(m), each data source 126 computes $H(v_i + \eta_i)$ 310 and each data source 126 computes $K(\eta_i)$ 312 using the second encryption function K(m). Each data source 126 may then send $H(v_i + \eta_i)$ 310 and $K(\eta_i)$ 312 to the secure data processor 120. The data source 126 may thereafter delete the noise value $\eta_i$ to thereby prevent its re-use with subsequent encryption.

The secure data processor 120 may determine that it has received the encrypted data plus noise 310 and the encrypted noise 312 from the data sources 126. Once the encrypted data plus noise 310 and the encrypted noise 312 is received, the secure data processor 120 computes the sum $H(\Sigma v_i + \Sigma \eta_i)$ 316 of the encrypted values-plus-noise data $H(v_i + \eta_i)$ 310a, 310b, ... 310n and the sum $K(\Sigma \eta_i)$ 318 of the encrypted noise data $K(\eta_i)$ 312a, 312b, ... 312n. As explained above, because the encryption functions H(m) and K(m) are additively homomorphic, the sum $H(\Sigma v_i + \Sigma \eta_i)$ 316 of the encrypted values-plus-noise data $H(v_i + \eta_i)$ 310a, 310b, ... 310n and the sum $K(\Sigma \eta_i)$ 318 of the encrypted noise data $K(\eta_i)$ 312a, 312b, ... 312n may be determined by multiplying and/or modulo-multiplying each encrypted values-plus-noise data $H(v_i + \eta_i)$ 310a, 310b, ... 310n and encrypted noise data $K(\eta_i)$ 312a, 312b, ... 312n in accordance with one or more of equations (14), (15), and/or (16). The secure data processor 120 may then send the sum $H(\Sigma v_i + \Sigma \eta_i)$ 316 and the sum $K(\Sigma \eta_i)$ 318 to the model provider 122.

The model provider 122 may decrypt the sum $H(\Sigma v_i + \Sigma \eta_i)$ 316 using the decryption function $H^{-1}(c)$ and may decrypt the sum $K(\Sigma \eta_i)$ 318 using the decryption function $K^{-1}(c)$. The model provider 122 may then subtract the sum of the decrypted noise data $\Sigma \eta_i$ from the sum of the values-plus-noise data $\Sigma(v_i + \eta_i)$ to determine the sum $\Sigma v_i$ 314 of the values $v_i$.

Figure 3D:
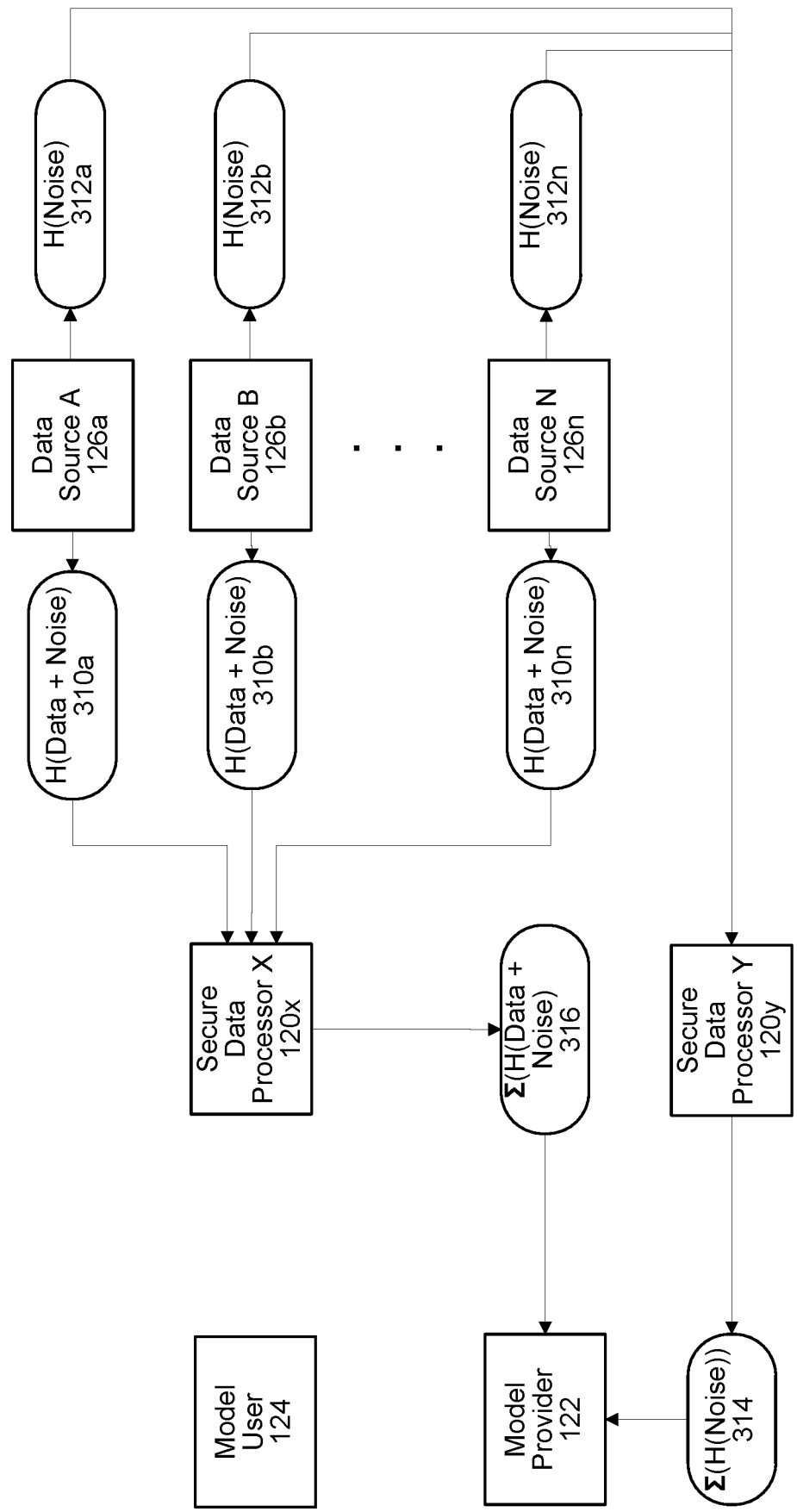

Referring to FIG. 3D, in some embodiments, the secure data processor 120 may include a first secure data processor 120x and a second secure data processor 120y. The first secure data processor 120x and second secure data processor 120y may be untrusted entities and may thus not be trusted to discover the value of the summed data $\Sigma v_i$. The first secure data processor 120x may receive the encrypted values-plus-noise data $H(v_i + \eta_i)$ 310a, 310b, ... 310n and send the encrypted values-plus-noise data $H(v_i + \eta_i)$ 310a, 310b, ... 310n to the model provider 122. The second secure data processor 120y may receive the encrypted noise data $H(\eta_i)$ 312a, 312b, ... 312n and may compute the sum $H(\Sigma \eta_i)$ 314 of the encrypted noise data $H(\eta_i)$ 312a, 312b, ... 312n, and may send the sum $H(\Sigma \eta_i)$ 314 to the model provider 122. The model provider 122 may then remove the sum H(Ση$_i$) 314 from the sum H(Σv$_i$+Ση$_i$) 316 to determine the sum Σv$_i$ of the values v$_i$, as described above.

Figure 3E:
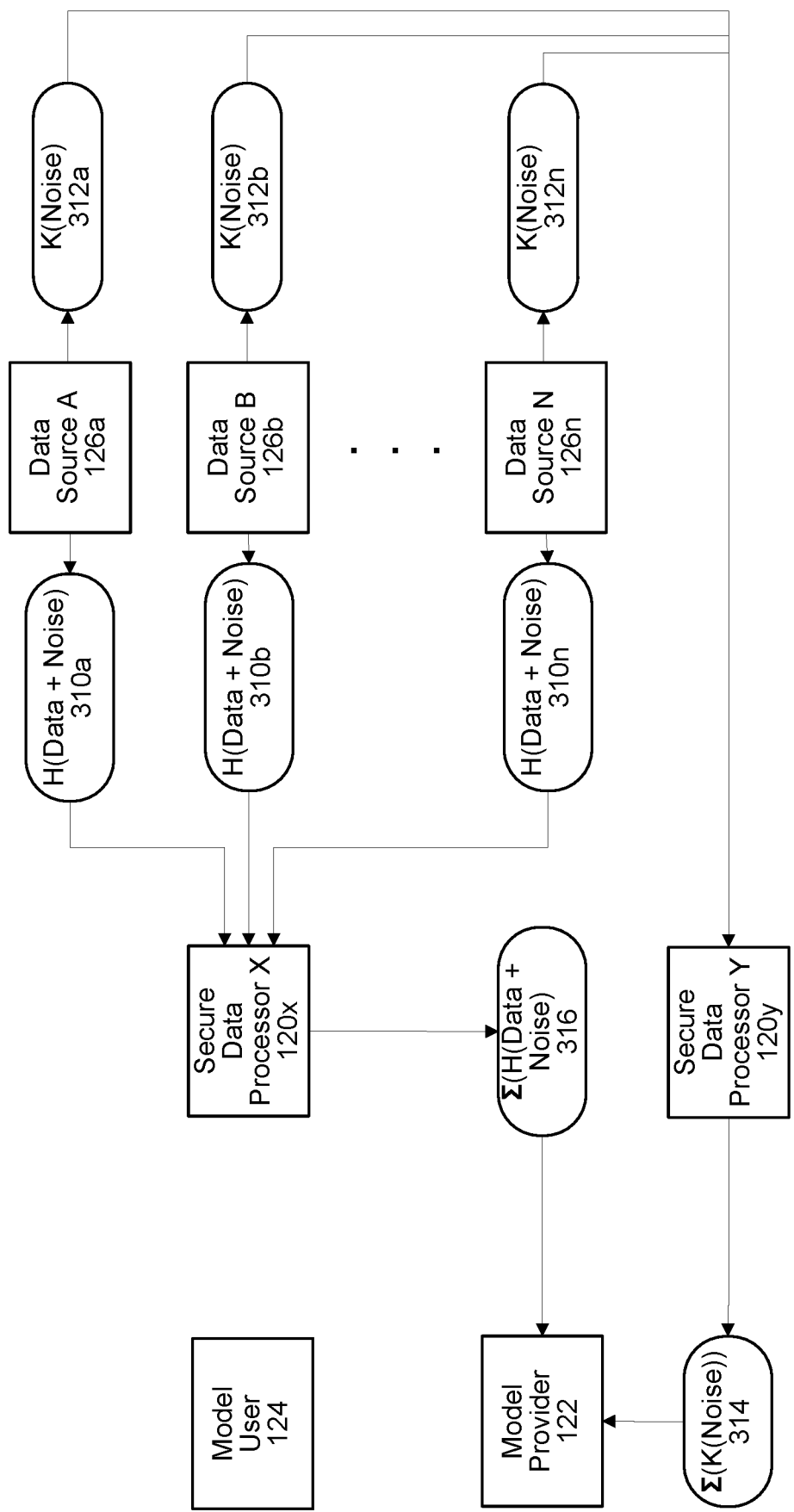

Referring to FIG. 3E, and with reference also to FIG. 3C, in some embodiments, the secure data processor 120 may include a first secure data processor 120x and a second secure data processor 120y. As discussed above with reference to FIG. 3C, each data source may encrypt the values-plus noise data v$_i$+η$_i$ with a first encryption function H(m) to create the encrypted values-plus-noise data H(v$_i$+η$_i$) 310a, 310b, . . . 310n, and may encrypt the noise data η$_i$ with a second encryption function K(m) to create the encrypted noise data K(η$_i$) 312a, 312b, . . . 312n. A first secure data processor 120x may sum the encrypted values-plus-noise data H(v$_i$+η$_i$) 310a, 310b, . . . 310n to create the sum H(Σv$_i$+Ση$_i$) 316, and a second secure data processor 120y may sum the encrypted noise data K(η$_i$) 312a, 312b, . . . 312n to create the sum H(Ση$_i$) 314. The model provider 122, as described above, may then remove the sum K(Ση$_i$) 314 from the sum H(Σv$_i$+Ση$_i$) 316 to determine the sum Σv$_i$ of the values v$_i$.

Figure 3F:
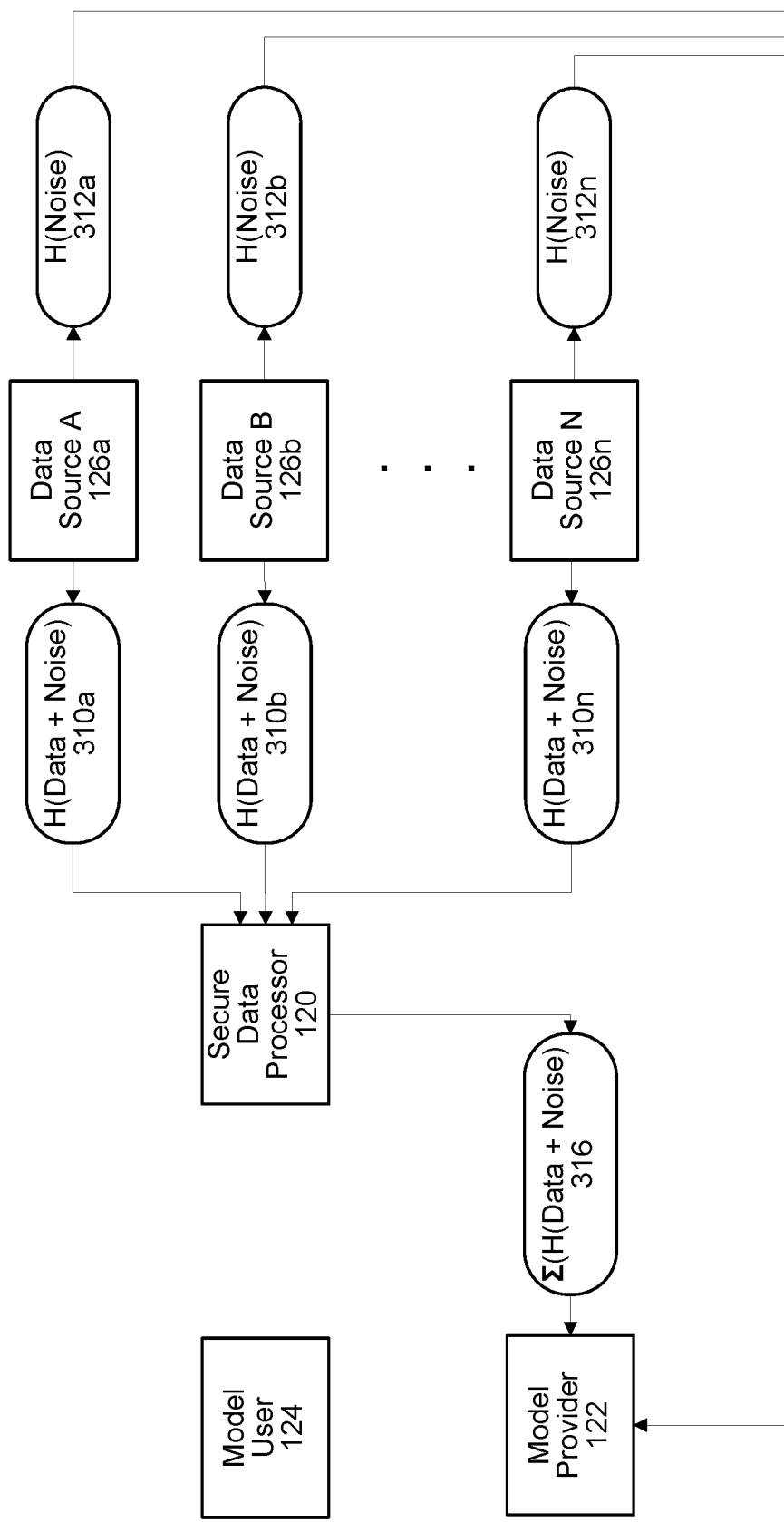

Referring to FIG. 3F, in some embodiments, the data sources 126 send the encrypted noise data H(η$_i$) 312 to the model provider 122 because the secure data processor 120 is not trusted to learn the sum Σv$_i$ 314 of the data v$_i$. In these embodiments, the data sources 126 compute the values-plus-noise data H(v$_i$+η$_i$) 310, as described above, and send the values-plus-noise data H(v$_i$+η$_i$) 310 to the secure data processor 120. The data sources 126 similarly compute the noise data H(η$_i$) 312, as described above, but send the noise data H(η$_i$) 312 to the model provider 122, not the secure data processor 120. The secure data processor 120 computes the sum H(Σv$_i$+Ση$_i$) of the encrypted values-plus-noise data H(v$_i$+η$_i$) 310a, 310b, . . . 310n. As explained above, because the encryption function H(m) is additively homomorphic, the sum H(Σv$_i$+Ση$_i$) of the encrypted values-plus-noise data H(v$_i$+η$_i$) 310a, 310b, . . . 310n may be determined by multiplying each encrypted values-plus-noise data H(v$_i$+η$_i$) 310a, 310b, . . . 310n.

The secure data processor 120 may then send the sum H(Σv$_i$+Ση$_i$) 316 of the encrypted values-plus-noise data H(v$_i$+η$_i$) 310a, 310b, . . . 310n to the model provider 122. The model provider 122 may then remove the encrypted noise data H(η$_i$) 312a, 312b, . . . 312n from the sum H(Σv$_i$+Ση$_i$) 316 to determine the encrypted sum H(Σv$_i$) and, finally, the sum Σv$_i$ 314. In some embodiments, the model provider 122 may decrypt each encrypted noise data H(η$_i$) 312a, 312b, . . . 312n using the decryption function H$^{-1}$(c). The model provider 122 may then decrypt the sum of the encrypted values-plus-noise data H(v$_i$+η$_i$) and subtract the decrypted noise data from the sum of the decrypted values-plus-noise data (v$_i$+η$_i$) to determine the sum (Σv$_i$) of the values v$_i$. In other embodiments, the model provider 122 subtracts the encrypted noise data H(η$_i$) 312a, 312b, . . . 312n from the sum H(Σv$_i$+Ση$_i$) 316 to determine the encrypted sum H(Σv$_i$) 314. The model provider 122 may subtract the encrypted noise data H(η$_i$) 312a, 312b, . . . 312n individually or may, in some embodiments, add the encrypted noise data H(η$_i$) 312a, 312b, . . . 312n together to create summed encrypted noise data H(Ση$_i$) before subtracting it from the encrypted sum H(Σv$_i$+Ση$_i$) 316. The model provider 122 may then determine the sum Σv$_i$ 314 of the data v$_i$ using the decryption function H$^{-1}$(c).

FIG. 3G illustrates a system for secure data processing in accordance with the present disclosure. In various embodiments, the system of FIG. 3G permits processing of integers and fixed-point numbers having sizes greater than 32 bits and permits up to $2^m$ data sources 126, where m is between 2 and 31 and wherein a block size is as large as 32−m. The value m may be, in some embodiments, 16. In various embodiments, a given fixed-point number f$_i$ may be expressed as an integer u$_i$ in accordance with the below equation (17).

$$f_i = \frac{u_i}{10^s} \quad (17)$$

In equation (15), s is any integer; the equation thus shifts the decimal point of f$_i$ to the right or left some number of places. In some embodiments, the decimal point is shifted to the right a number of places necessary to convert the fixed-point f$_i$ to the integer u$_i$. The secure data processor 120, model provider 122, and data sources 126 may all use the same value for s. If s is smaller than the actual number of decimal places of f$_i$, the integer u$_i$ may represent a rounded value of f$_i$; if s is larger than the actual number of decimal places of f$_i$, the integer u$_i$ may include a number of zeros at its end. The sum of the f$_i$ values may similarly relate to the sum of the u$_i$ values in accordance with the below equation (18).

$$\Sigma f_i = \frac{\Sigma u_i}{10^s} \quad (18)$$

Each integer value u$_i$ may be expressed as a sum of 16-bit blocks in accordance with the below equation (19).

$$u_i = \sum_i \sum_j \frac{u_{ij}}{2^{16j}} \quad (19)$$

Thus, u$_i$ may be defined as a set of values <u$_{ij}$>, where u$_{ij}$ is the value for each 16-bit block. Each value of u$_{ij}$ may be between $-2^{15}$ and $2^{15}-1$; because each block is 16 bits, the sum of all the values of u$_{ij}$ may between $-2^{31}$ and $2^{31}-1$. In addition, because each block is 16 bits, there may be up to $2^{16}$ data sources 126.

Thus the model provider 122 may define the value s and transmit the value s to the data sources 126. The model provider 122 may similarly define and transmit a block size, such as 16 bits, to the secure data processor 120, data sources 126, and/or model user 124. Each data source 126 possesses at least one fixed-point value f$_i$, which it converts to the corresponding integer u$_i$ in accordance with equation (19), and may compute u$_i$=<u$_{ij}$> using the value s and the block size, in accordance with equation (16). The data sources 126 may encrypt these values using the encryption function H(m), as described above, and send the encrypted data to the secure data processor 120. The secure data processor 120 may compute the sum of all the encrypted data received from the data sources 126, as described above, and send the sum to the model provider 122. The model provider 122 may compute the unencrypted sum of all the encrypted data using the decryption function H$^{-1}$(c), as described above, and may convert the integer value u$_i$ to its corresponding fixed-point value f$_i$ using equation (19).

The data sources 126 may determine and use a noise value noise value η$_i$ when sending the data to the secure data processor 120, as described above. In some embodiments, in addition to using the noise value η$_i$ as described above, the data sources determine and use a second noise value p$_i$. For example, in cases in which $u_i$ is small and j is large, some values of $u_{ij}$ may be zero. If $u_{ij}$ is zero, the encrypted value $H(u_{ij}+\eta_i)$ becomes simply $H(\eta_i)$, and a component of the system not permitted to learn $\eta_i$, such as, in some embodiments, the secure data processor 120, could learn noise value $\eta_i$ simply by decrypting $H^{-1}(u_{ij}+\eta_i)$.

Thus, in some embodiments, the data source 126 adds the second noise value $p_i$ to the integer value $u_i$ before processing the integer value $u_i$. The data sources 126 send the encrypted data plus first noise value 320 to the secure data processor 120; the data sources 126 also send the encrypted first noise value and the encrypted second noise value 322 to the model provider 122. After computing $u_i$ as described above, the model provider 122 may decrypt the encrypted second noise value $p_i$ and remove it from the data value $u_i$, as described above.

Figure 3H:
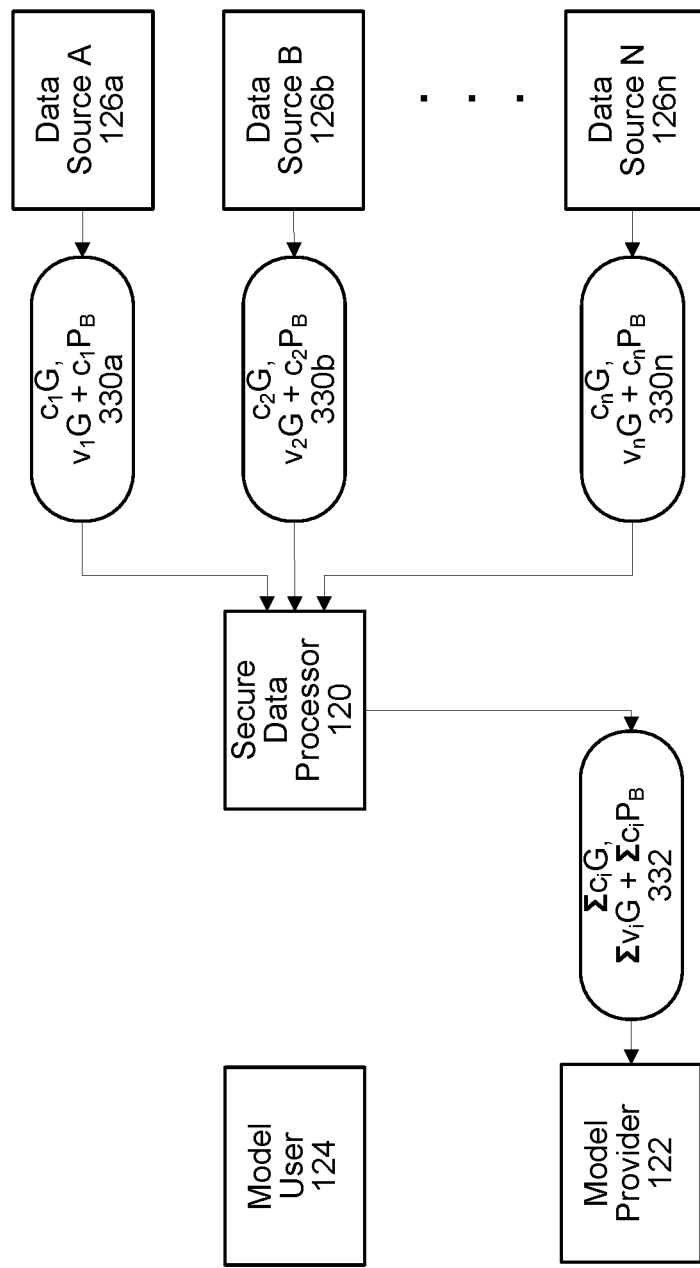

Referring to FIG. 3H, in some embodiments, the secure data processor 120, model user 124, and/or data sources 126 may use elliptic-curve cryptography to securely process, send, and/or receive data. Elliptic-curve cryptography utilizes an elliptic curve to encrypt data, as opposed to multiplying two prime numbers to create a modulus, as described above. An elliptic curve E is a plane curve over a finite field $F_p$ of prime numbers that satisfies the below equation (20).

$$y^2 = x^3 + ax + b \quad (20)$$

The finite field $F_p$ of prime numbers may be, for example, the NIST P-521 field defined by the U.S. National Institute of Standards and Technology (NIST). In some embodiments, elliptic curves over binary fields, such as NIST curve B-571, may be used as the finite field $F_p$ of prime numbers. A key is represented as (x,y) coordinates of a point on the curve; an operator may be defined such that using the operator on two (x,y) coordinates on the curve yields a third (x,y) coordinate also on the curve. Thus, key transfer may be performed by transmitting only one coordinate and identifying information of the second coordinate.

The above elliptic curve may have a generator point, G, that is a point on the curve—e.g., $G=(x,y)\in E$. A number n of points on the curve may have the same order as G—e.g., $n=o(G)$. The identity element of the curve E may be infinity. A cofactor h of the curve E may be defined by the following equation (21).

$$h = \frac{|E(F_p)|}{o(G)} \quad (21)$$

A first party, such as the model provider 122, may select a private key $n_B$ that is less than $o(G)$. In various embodiments, the secure data processor 120 is not the first party and thus does not know the private key $n_B$. The first party may generate a public key $P_B$ in accordance with equation (22).

$$P_B = n_B G = \Sigma_i^{n_B} G \quad (22)$$

The first party may then transmit the public key $P_B$ to a second party, such as a data source 126. The first party may similarly transmit encryption key data corresponding to domain parameters (p, a, b, G, n, h). The data source 126 may then encrypt data m using the public key $P_B$. The data source 126 may first encode the data m; if m is greater than zero, the data source 126 may encode it in accordance with mG; m is less than zero, the data source 126 may encode it in accordance with $(-m)G^{-1}$. If $G=(x,y)$, $G^{-1}=(x,-y)$. In the below equations, however, the encoded data is represented as mG for clarity. The data source 126 may perform the encoding using, for example, a doubling-and-adding method, in $O(\log(m))$ time.

To encrypt the encoded data mG, the data source 126 may select a random number c, wherein c is greater than zero and less than a finite field prime number p. The data source 126 may thereafter determine and send encrypted data in accordance with the below equation (23).

$$\{cG, mG+cP_B\} \quad (23)$$

The model provider 122 may receive the encrypted data from the data source 126 and may first determine a product of the random number c and the public key $P_B$ in accordance with equation (24).

$$cP_B = c(n_B G) = n_B(cG) \quad (24)$$

The model provider 122 may then determine a product of the data m and the generator point G in accordance with the below equation (25).

$$mG = (mG+cP_B) - n_B(cG) \quad (25)$$

Finally, the model provider 122 may decode mG to determine the data m. This decoding, which may be referred to as solving the elliptic curve discrete logarithm, may be performed using, for example, a baby-step-giant-step algorithm in $O(\sqrt{m})$ time.

As shown in FIG. 3H, each data source 126 encrypts data $v_i$ using the public key $P_B$ and a selected random value c to create encrypted data 330 in accordance with the above equation (23). The data $v_i$ may be a 32-bit signed integer value. The encrypted data 330 may correspond to a pair of integers; the first integer may be $(c_i G)$, and the second integer may be $(v_i G + c_i P_B)$. Each data source 126 may then send the encrypted data 330 to the secure data processor 120 using, in some embodiments, a secure connection. Because, as described above, the encrypted data 330 is additively homomorphic, the secure data processor 120 may compute the sum 332 of the received data 330 in accordance with the above equations (14), (15), and/or (16). The secure data processor 120 may then send the sum 332 to the model provider 122. The sum 332 may correspond to a pair of integers; the first integer may be $\Sigma(c_i G)$, and the second integer may be $(\Sigma v_i G + \Sigma_{c_i} P_B)$.

The model provider 122 may decrypt the sum 332 by first determining the product of the sum of the random numbers c and the public key $P_B$ (i.e., the second half of the second integer of the sum 332), using the first integer, the private key $n_B$, and the generator G, in accordance with the below equation (26).

$$\Sigma_i c_i P_B = \Sigma_i c_i (n_B G) = n_B (\Sigma_i c_i G) \quad (26)$$

The model provider 122 may then determine the product of the sum of the data $v_i$ and G by subtracting the second half of the second integer of the sum 332 from the second integer of the sum 332 in accordance with the below equation (27).

$$\Sigma_i v_i G = (\Sigma_i v_i G + \Sigma_i c_i P_B) - \Sigma_i c_i P_B \quad (27)$$

The model provider 122 may then decode the sum $\Sigma v_i G$ to determine $\Sigma v_i$ using, as described above, a baby-step-giant-step algorithm.

In some embodiments, with reference also to FIG. 3H and associated text, the secure data processor 120, model provider 122, model user 124, and/or data sources 126 send and receive data in blocks, such as 16-bit blocks, which permits the sending and receiving of fixed point numbers and/or integers larger than 32 bits. The model provider 122 may determine an integer s in accordance with equation 17 and transmit the integer s to the data sources 126. Each data source 126 may then convert a fixed point number to an integer in accordance with equation (18) and/or create a number 16-bit blocks representing the number in accordance with equation (19) prior to sending encrypting and sending the data 330.

Figure 4A:
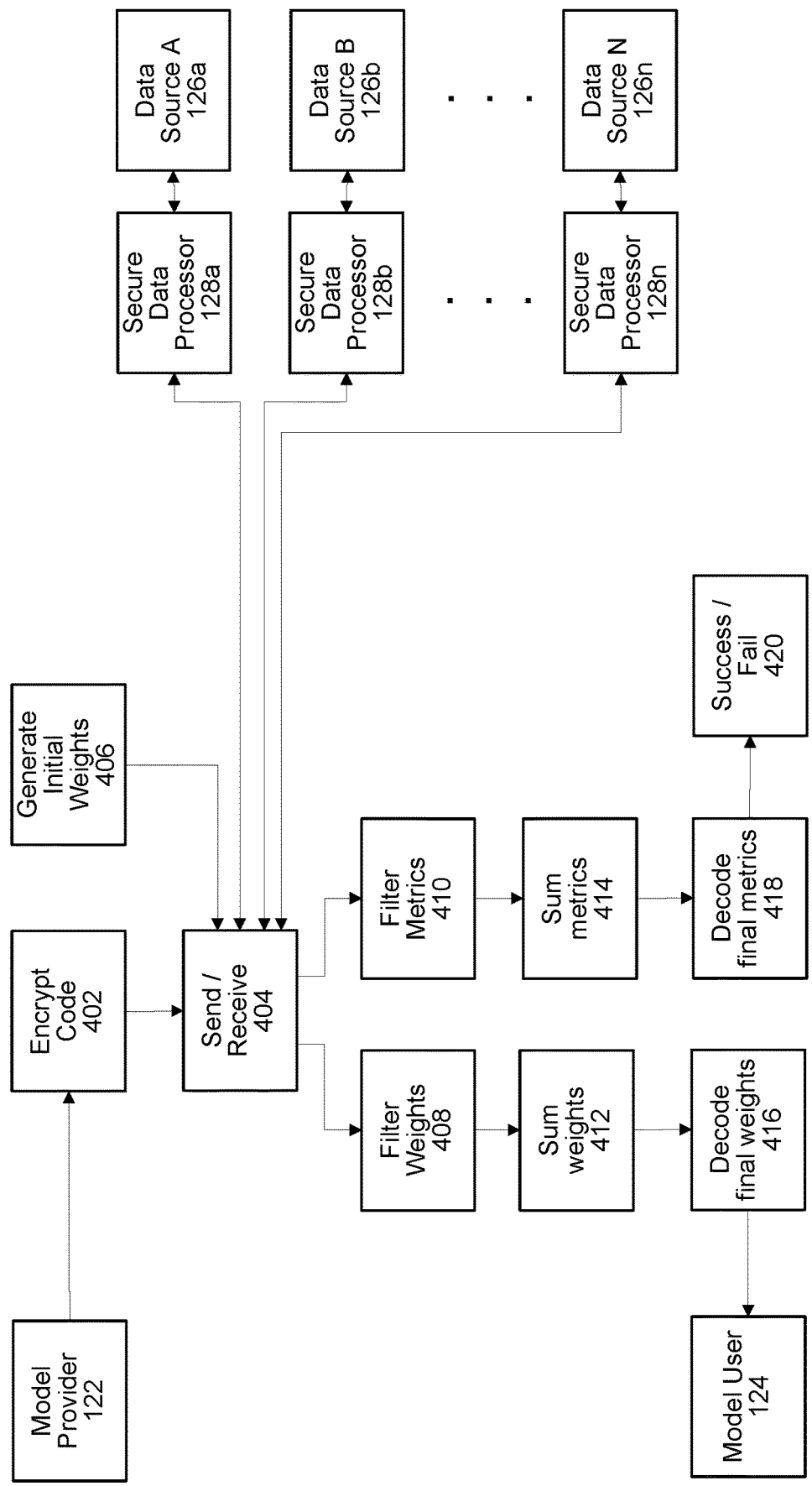
FIGS. 4A and 4B illustrate components for training a neural network according to embodiments of the present disclosure.
Figure 4B:
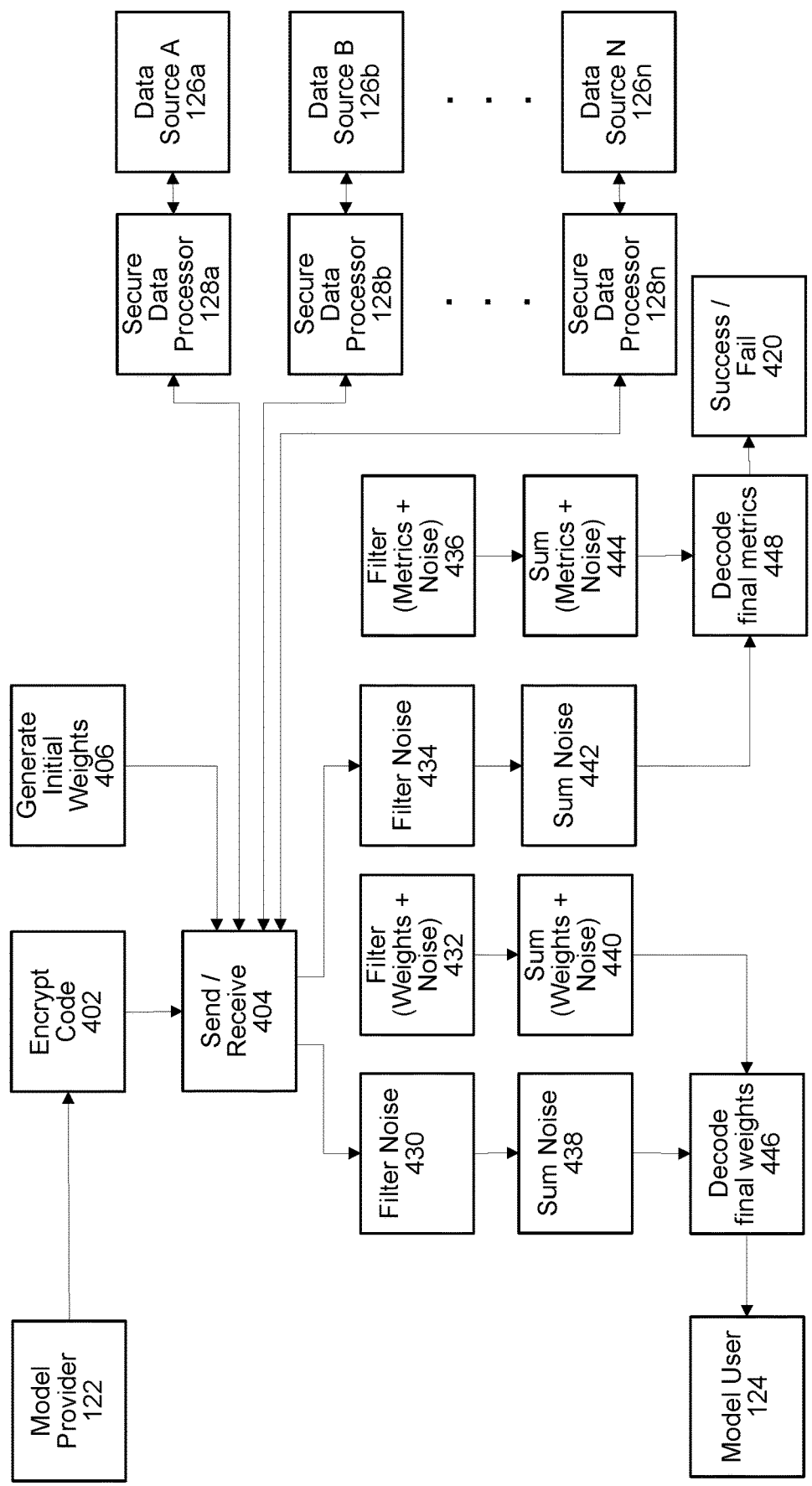

FIGS. 4A and 4B illustrate a secure data processor 120 for training a neural network according to embodiments of the present disclosure. A code encryption component 402 receives, from a model provider 222, unencrypted code describing a model, such as a neural network. The model may include configurable values that control the output of the model given inputs to the model; these configurable values are referred to herein as weights (as described in greater detail with reference to FIG. 8). The code encryption component 402 encrypts the code (which may include encrypting the model and/or weights associated with the model) using, for example, the encryption function H(m) described herein. The encryption function H(m), and its associated public and private encryption key data described herein, may be created by the model provider 122, and the public encryption key data may be sent to the data sources 126. In some embodiments, the encryption function H(m) and its associated public and private encryption key data is created by the model owner 124. In these embodiments, the model owner 124 may use the encryption key data to decrypt a trained neural network, while the model provider 122 is prevented from decrypting the trained neural network. In these embodiments, the model owner 124 may additionally decrypt training data during training of the model, such as the performance metrics described herein.

A send/receive component 404 receives the encrypted computer instructions from the code encryption component 402, which it may send to the data sources 126. The send/receive component 404 further receives a set of initial weights from an initial-weight generation component 406. The initial weights may be random values; the initial-weight generation component 406 may include, for example, a random-number generator and may generate fixed-point random numbers between 0.0 and 1.0 as the initial weights. Because the initial weights are random, if a third party were to possess only the weight updates, as described below, the third party would not be able to derive the actual weights at least because possession of both the weight updates and the initial weights is necessary to derive the actual weights.

The send/receive component 404 receives, from one or more data sources 126, change data encrypted using the techniques described herein, such as by using the encryption function H(m). The encrypted change data may include changes in weights (i.e., weight updates) corresponding to a model, gradients corresponding to a model, and/or metrics of performance of the model as modified with the changes and/or gradients. Each data source 126 may create model-output data by applying, to a copy of the model, the values $v_i$ described herein using a secure data processor 128, which may be a gradient-descent processor. Using the gradient descent techniques described herein, the secure data processor 128 applies the values v, to the model and determines, based on outputs of the model, one or more weight updates and/or one or metrics of accuracy of the outputs of the model.

The metrics may include, for example, a degree of similarity between outputs of the model and outputs expected from training data. A metric of 100 may, for example, indicate perfect similarity, while a metric of 0 may indicate no similarity. Based on the performance of the model, the secure data processor 128 further determines a set of weight updates. The weight updates may include positive or negative numbers indicating how much a particular weight should be increased or decreased. The weight updates may not include the actual weights. The secure data processor 128 may encrypt the change data (e.g., weight updates and/or corresponding metric updates) with an encryption function H(m) before sending them to the send/receive component 404. The send/receive component 404 may then send the received encrypted weight updates to a weight-filtering component 408 and a metric-filtering component 410, respectively.

The weight-filtering component 408 may filter the weight updates, and the metric-filtering component 410 may filter the metric updates. The filter components 408, 410 may filter the weight and/or metric updates by removing updates greater than a first threshold or lower than a second threshold. The filter components 408, 410 may further normalize the update data by applying a normalization function, such as a sigmoid function.

A weight-summing component 412 may sum the filtered weight updates over several iterations of operation of the gradient descent technique by the secure data processor 128, and metric-summing component 414 may similarly sum the filtered metric updates over several iterations of operation of the gradient descent technique by the secure data processor 128 to create encrypted summation data, which may include the summed encrypted weights and/or summed encrypted metrics. As described herein, the summing components 412, 414 may sum the filtered update data, because the data is additively homomorphic, by multiplying the data together.

Once the available data from the data sources 126 has been applied to the model and once the gradient descent technique has been applied by the secure data processor 128 for all the data, a final weight decode component 416 create decrypted change data by decoding final summed weights, and a final metric decode component 418 may create decrypted change data by decoding final summed metrics using, for example, the decryption function $H^{-1}(c)$ described herein. A success/fail determination component 420 may compare the final metrics to a quality threshold; if the final metrics satisfy the threshold, the system may send the decrypted summation data, which may include the final summed weights, to the model user 124.

With reference to FIG. 4B, the data sources 126 may add noise to their data prior to sending the data, as described herein. In these embodiments, the secure data processor 120 includes additional components to filter and add the data and noise: a weight-noise filter component 430, a weight-and-noise filter component 432, a metric-noise filter component 434, a metric-and-noise filter component 436, weight-noise summing component 438, a weight-and-noise summing component 440, a metric-noise summing component 442, and a metric-and-noise summing component 444. These components may process data in an analogous manner as the weight filter component 408, the metric filter component 410, the weight summing component 412, and the metric summing component 414, respectively, as described above. The final weight decode component 446 may receive the output of both the weight-noise summing component 438 and the weight-and-noise summing component 440 and may remove the noise from the weights, as described above. Similarly, the final metric decode component 448 may receive the output of both the metric-noise summing component 442 and the metric-and-noise summing component 444 and may remove the noise from the metrics. The success/fail determination component 420 may compare the final metrics to a quality threshold; if the final metrics satisfy the threshold, the system may send the final weights to the model user 124.

FIGS. 5A and 5B illustrate a flow diagram for transacting to build a neural network according to embodiments of the present disclosure. Referring first to FIG. 5A, the model user 124 sends, to a market 504, a challenge 508 defining a problem the model user 124 wishes to solve. The market 504 may be, for example, an e-commerce website that coordinates transfer of data to and from the model provider 122 and the data sources 126. For example, if the model user 124 is a power company, the model user 124 may wish the building of a model to predict failure of a component. The challenge 508 may also include a minimum accuracy of the model in predicting the failure. The challenge 508 may also include a minimum data quality and/or minimum data amount.

The secure data processor 120 and/or model provider 122 sends, to the market 504, an indication 510 to initiate a search for available challenges. The indication 510 may include types of challenges that the secure data processor 120 and/or model provider 122 are capable of solving, compensation requirements, and/or timeframes for solving. The market 508 may send challenge search results 512 back to the secure data processor 120 and/or model provider 122; the search results 512 may include an indication of the challenge 508. Similarly, one or more data sources 126 may send an indication 514 to initiate a search for available challenges. The indication 514 may include the type of data that the data source 126 is offering, the quality of the data, and/or the amount of the data, as well as compensation requirements. The indication 514 may further include a requirement that the data source 126 also be a model user 124. The market 504 may similarly send a result 516 back to the data source 126; the result 516 may include an indication of the challenge 508. If the secure data processor 120 and/or model provider 122 accepts the challenge, it may send an offer to solve 518 back to the market 504; the data source 126 may similarly send an offer 520 to send data. The secure data processor, model provider 122, and or market 504 may determine an estimated amount of computing resources required to solve the problem; this amount may be specified in, for example, the offer to solve 518. The offer to solve 518 may include a payment amount request that is based on the estimated amount of computing resources.

The market 504 may send, to the model user 124, an indication 522 to inspect the accepted offers. The model user 124 may evaluate the offers based on a number of criteria, such as completion time and cost. If the model user 124 accepts one or more offers, it sends a corresponding indication 524 of acceptance to the market 504.

Once the offer is accepted, the model user 124 sends the agreed-upon payment to an escrow service 502. Once the escrow service 502 receives the payment, it sends an indication 528 to start the challenge to a network 506, such as the network 199. The network 506 sends a corresponding indication 530 to start the challenge to the secure data processor 120 and/or model provider 122.

The secure data processor 120 and/or model provider 122 writes code corresponding to the challenge and sends the written code 532 to the network 506, which sends corresponding code 534 to one or more data sources 126. The data sources 126 apply their data to the code and send the results 536 of the running the challenge to the escrow service 502, which sends a corresponding solution 538 to the challenge to the model user. As discussed above, the solution 538 may be a set of weights and/or initial weights and weight updates for the model. The model user 124 may request additional challenges to further improve the model; for example, the model user 124 may send, to the market 504, further requests for data. If the model user 124 accepts the solution 538, the escrow service 502 sends a first payment 540 to the data source 126 and a second payment 542 to the secure data processor 120 and/or model provider 122. In some embodiments, the payments are made using self-executing (i.e., "smart") contracts.

Figure 6:
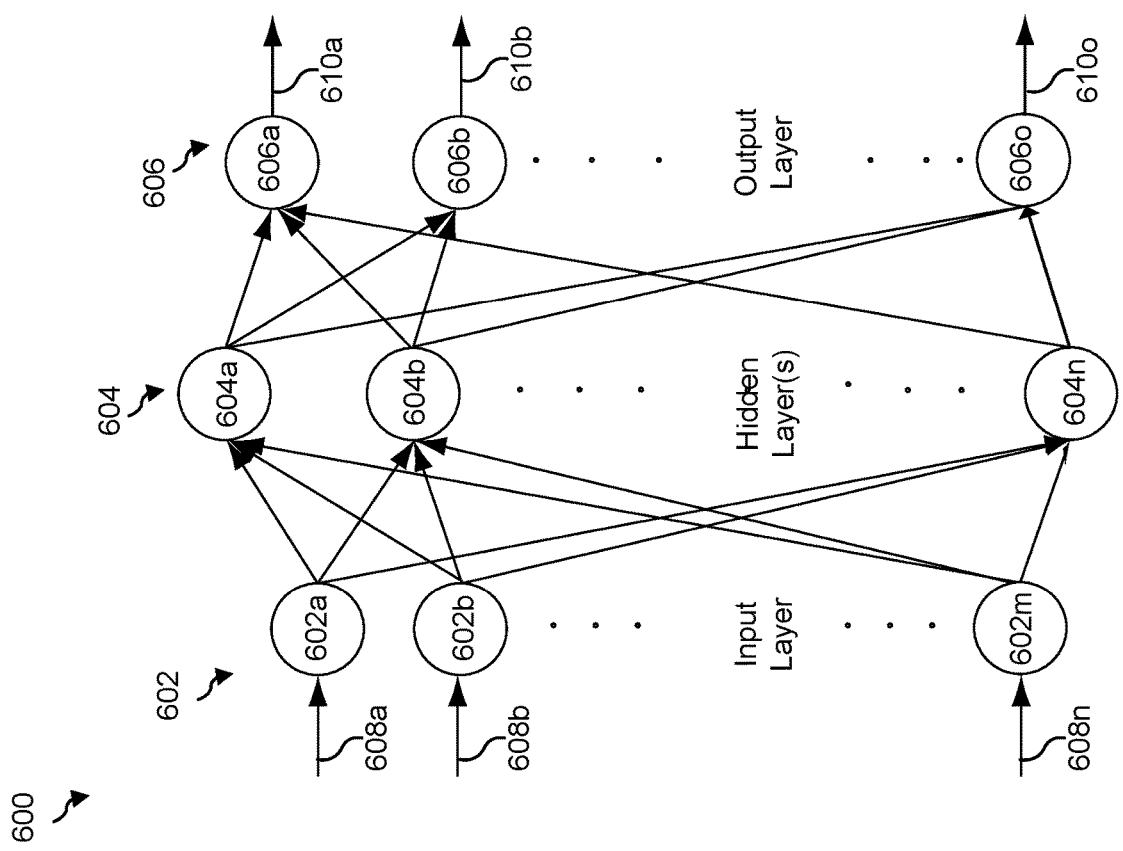
FIG. 6 illustrates an example structure of a neural network according to embodiments of the present disclosure.

As mentioned above, a neural network may be trained to perform some or all of the computational tasks described herein. An example neural network 600 is illustrated in FIG. 6. The neural network 600 may include nodes organized as an input layer 602, one or more hidden layers 604, and an output layer 606. The input layer 602 may include m nodes, the hidden layer(s) 604 may include n nodes, and the output layer 606 may include o nodes, where m, n, and o may be any numbers and may represent the same or different numbers of nodes for each layer. Each node of each layer 602, 604, 606 may include computer-executable instructions and/or data usable for receiving one or more input values and for computing an output value. Each node may further include memory for storing the input, output, or intermediate values. One or more data structures, such as a long short-term memory (LSTM) cell or other cells or layers (as described in greater detail with reference to FIG. 8), may additionally be associated with each node for purposes of storing different values. Nodes 602*a*, 602*b*, . . . 602*m* of the input layer 602 may receive inputs 608*a*, 608*b*, . . . 608*m*, and nodes 606*a*, 606*b*, . . . 606*o* of the output layer 206 may produce outputs 610*a*, 610*b*, . . . 610*o*. In some embodiments, the inputs 608*a*, 608*b*, . . . 608*m* correspond to data from a data source, and the outputs 610*a*, 610*b*, . . . 610*o* correspond to model output data. Each node 604*a*, 604*b*, . . . 604*m* of the hidden layer 604 may be connected to one or more nodes 602*a*, 602*b*, . . . 602*m* in the input layer 602 and one or more nodes 606*a*, 606*b*, . . . 606*o* in the output layer 604. Although the neural network 500 illustrated in FIG. 6 includes a single hidden layer 604, other neural networks may include multiple middle layers 604; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 7:
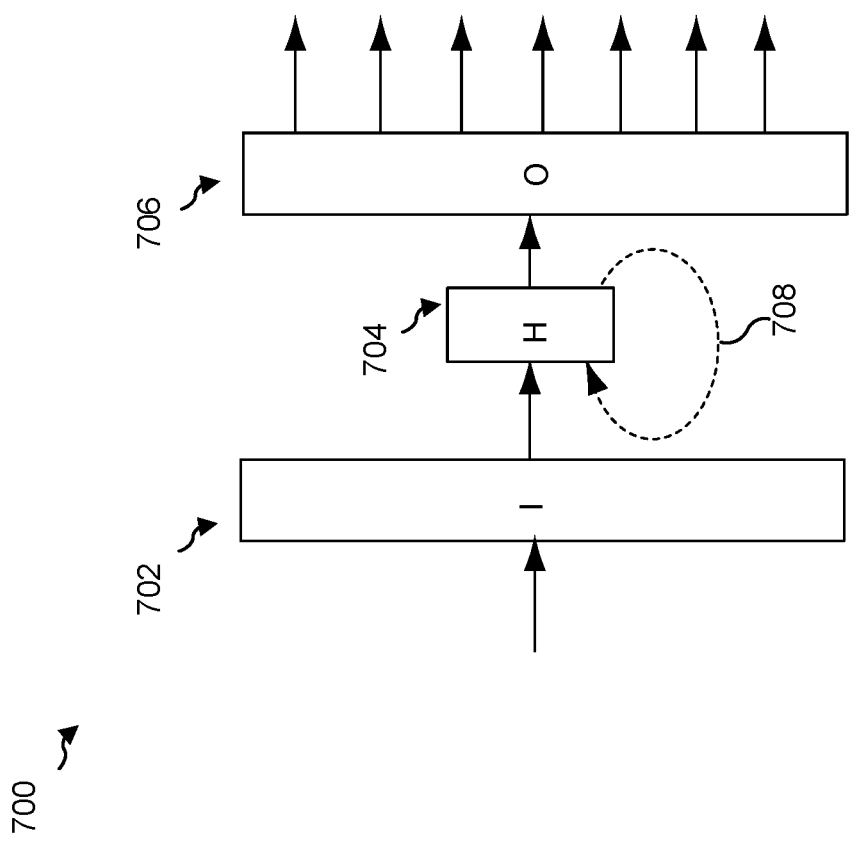
FIG. 7 illustrates an example structure of a recurrent neural network according to embodiments of the present disclosure.

In some embodiments, a neural network is constructed using recurrent connections such that one or more outputs of the hidden layer of the network feeds back into the hidden layer again as a next set of inputs. Such a neural network 700 is illustrated in FIG. 7. Each node of the input layer 702 connects to each node of the hidden layer(s) 704; each node of the hidden layer(s) 704 connects to each node of the output layer 706. As illustrated, one or more outputs 708 of the hidden layer(s) 704 is fed back into the hidden layer 704 for processing of the next set of inputs. A neural network incorporating recurrent connections may be referred to as a recurrent neural network (RNN). An RNN or other such feedback network may allow a network to retain a "memory" of previous states and information that the network has processed.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as backpropagation, the weights of the neural network may be updated to reduce errors made by the neural network when processing the training data. In some circumstances, the neural network may be trained with an entire lattice to improve speech recognition when the entire lattice is processed.

Figure 8:
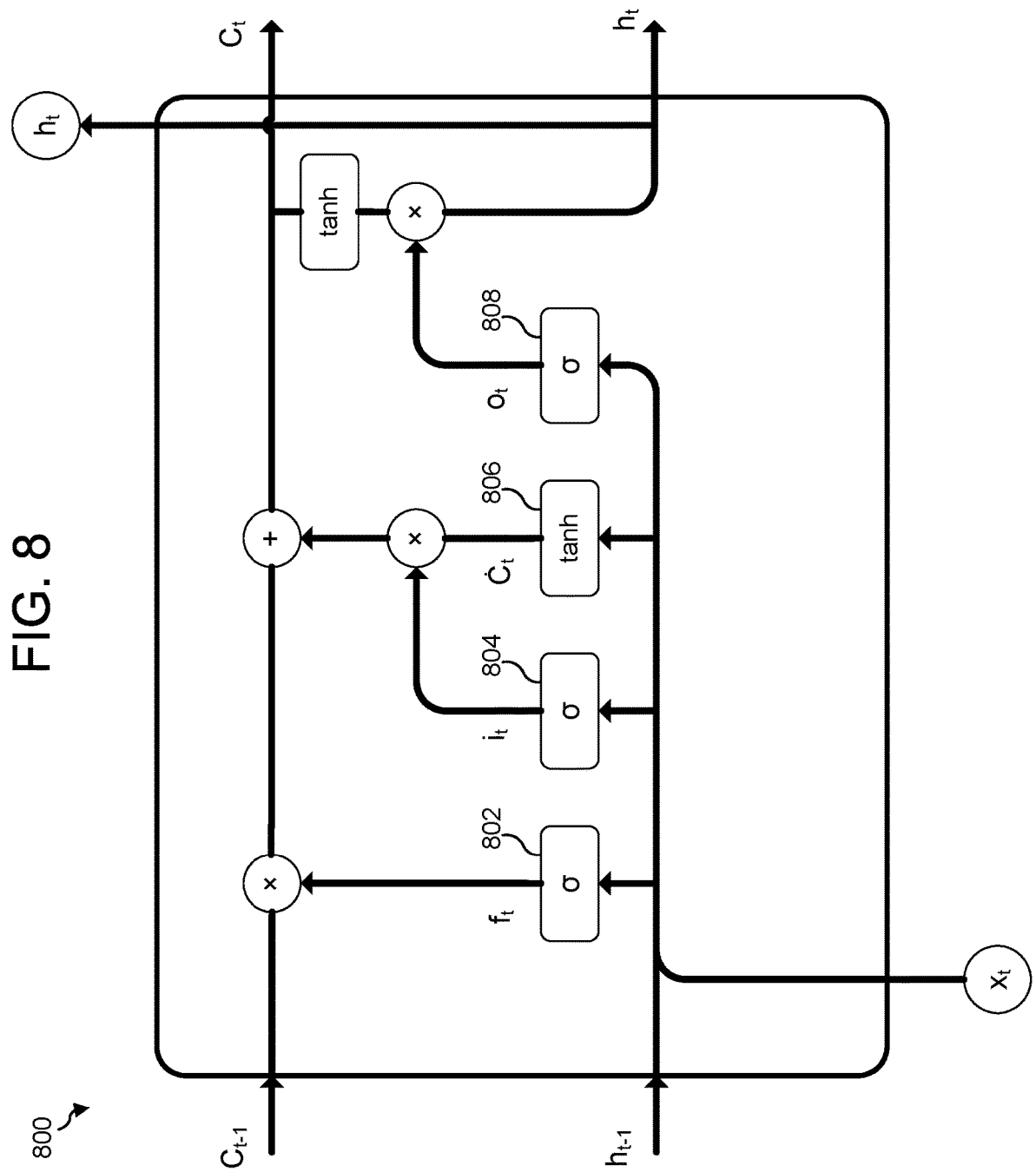
FIG. 8 illustrates a long-short-term memory (LSTM) cell according to embodiments of the present disclosure.

FIG. 8 illustrates an exemplary long short-term memory (LSTM) cell 800 capable of learning long-term dependencies and which may be used in building one or more of the models described herein. The LSTM cell 800 receives an input vector $x_t$ and generates an output vector $h_t$. The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 802, an "input gate" layer 804, a tan h layer 806, and a sigmoid layer 808.

The forget gate layer 802 may be used to remove information from the previous cell state $C_{t-1}$. The forget gate layer 802 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 402 may be defined by the below equation (17). The layer 802 may be modified by changing one or more of the weights σ, $W_f$, and/or $b_f$.

$$f_t = \sigma\{W_f \cdot [(h_{t-1}),(x_t)] + b_f\} \quad (17)$$

The input gate layer 804 and the tan h layer 806 may be used to decide what new information should be stored in the cell state $C_{t-1}$. The input gate layer 804 determines which values are to be updated by generating a vector it of numbers between 0 and 1 for information that should not and should be updated, respectively. The tan h layer 806 creates a vector $\dot{C}_t$ of new candidate values that might be added to the cell state $C_t$. The vectors it and $\dot{C}_t$, defined below in equations (18) and (19), may thereafter be combined and added to the combination of the previous state $C_{t-1}$ and the output $f_t$ of the forget gate layer 402 to create an update to the state $C_t$. The layers 804, 806 may be modified by changing one or more of the weights σ, $W_i$, $b_i$, $W_c$, and/or $b_c$.

$$i_t = \sigma\{W_i \cdot [(h_{t-1}),(x_t)] + b_i\} \quad (18)$$

$$\dot{C}_t = \tan h\{W_C \cdot [(h_{t-1}),(x_t)] + b_C\} \quad (19)$$

Once the new cell state $C_t$ is determined, the sigmoid layer 808 may be used to select which parts of the cell state $C_t$ should be combined with the input $x_t$ to create the output $h_t$. The output $o_t$ of the sigmoid layer 808 and output $h_t$ may thus be defined by the below equations (20) and (21). These values may be further updated by sending them again through the cell 800 and/or through additional instances of the cell 400. The sigmoid layer 808 may be modified by changing one or more of the weights σ, $\sigma_t$, $W_o$, and/or $b_o$.

$$o_t = \sigma\{W_o \cdot [(h_{t-1}),(x_t)] + b_o\} \quad (20)$$

$$h_t = o_t \cdot [\tan h(C_t)] \quad (21)$$

The model(s) discussed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, may require establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired. The model may be updated by, for example, back-propagating the error data from output nodes back to hidden and input nodes; the method of back-propagation may include gradient descent.

In some embodiments, the trained model is a deep neural network (DNN) that is trained using distributed batch stochastic gradient descent; batches of training data may be distributed to computation nodes where they are fed through the DNN in order to compute a gradient for that batch. The secure data processor 120 may update the DNN by computing a gradient by comparing results predicted using the DNN to training data and back-propagating error data based thereon. In some embodiments, the DNN includes additional forward pass targets that estimate synthetic gradient values and the secure data processor 120 updates the DNN by selecting one or more synthetic gradient values.

Figure 9:
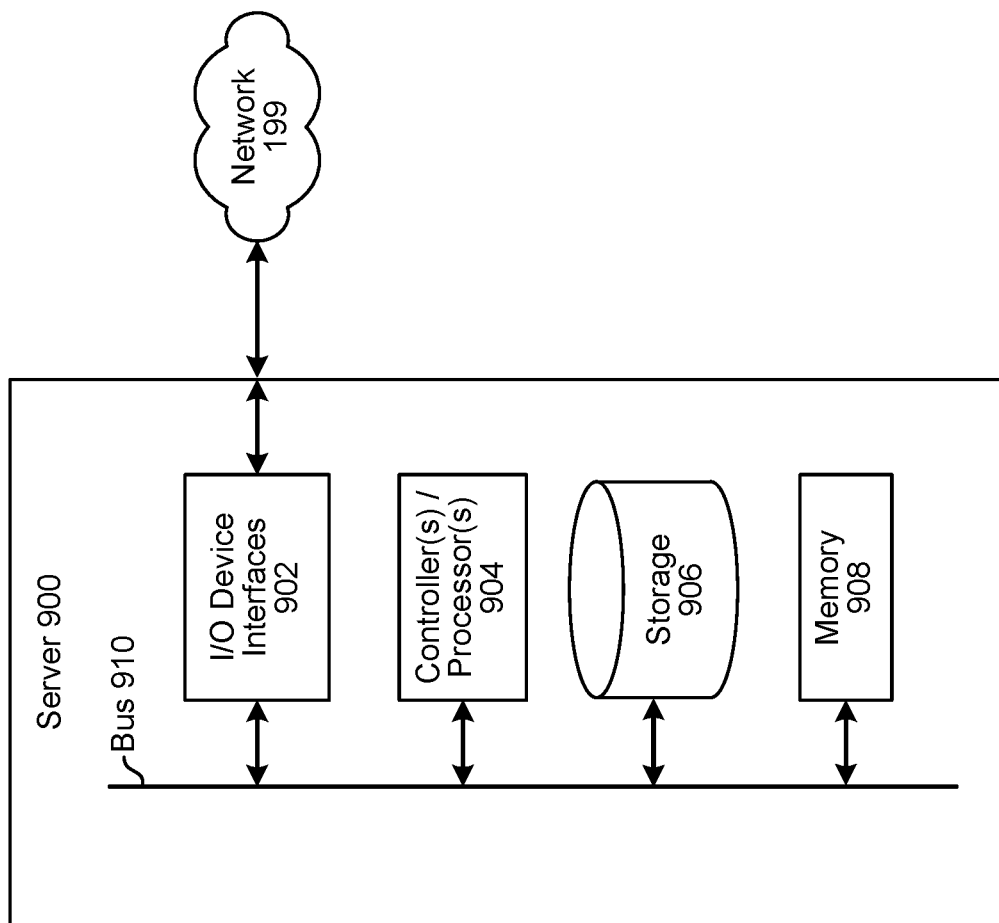
FIG. 9 is a conceptual diagram of components of a system according to embodiments of the present disclosure.

FIG. 9 is a block diagram illustrating a computing environment that includes a server 900; the server 900 may be the secure data processor 120, model provider 122, model user 124, and/or data source 126. The server 900 may include one or more input/output device interfaces 902 and controllers/processors 904. The server 900 may further include storage 906 and a memory 908. A bus 910 may allow the input/output device interfaces 902, controllers/processors 904, storage 906, and memory 908 to communicate with each other; the components may instead or in addition be directly connected to each other or be connected via a different bus.

A variety of components may be connected through the input/output device interfaces 902. For example, the input/output device interfaces 902 may be used to connect to the network 199. Further components include keyboards, mice, displays, touchscreens, microphones, speakers, and any other type of user input/output device. The components may further include USB drives, removable hard drives, or any other type of removable storage.

The controllers/processors 904 may processes data and computer-readable instructions, and may include a general-purpose central-processing unit, a specific-purpose processor such as a graphics processor, a digital-signal processor, an application-specific integrated circuit, a microcontroller, or any other type of controller or processor. The memory 908 may include volatile random access memory (RAM), non-volatile read only memory (ROM), non-volatile magnetoresistive (MRAM), and/or other types of memory. The storage 906 may be used for storing data and controller/processor-executable instructions on one or more non-volatile storage types, such as magnetic storage, optical storage, solid-state storage, etc.

Computer instructions for operating the server 900 and its various components may be executed by the controller(s)/processor(s) 904 using the memory 908 as temporary "working" storage at runtime. The computer instructions may be stored in a non-transitory manner in the memory 908, storage 906, and/or an external device(s). Alternatively, some or all of the executable instructions may be embedded in hardware or firmware on the respective device in addition to or instead of software.

Figure 10:
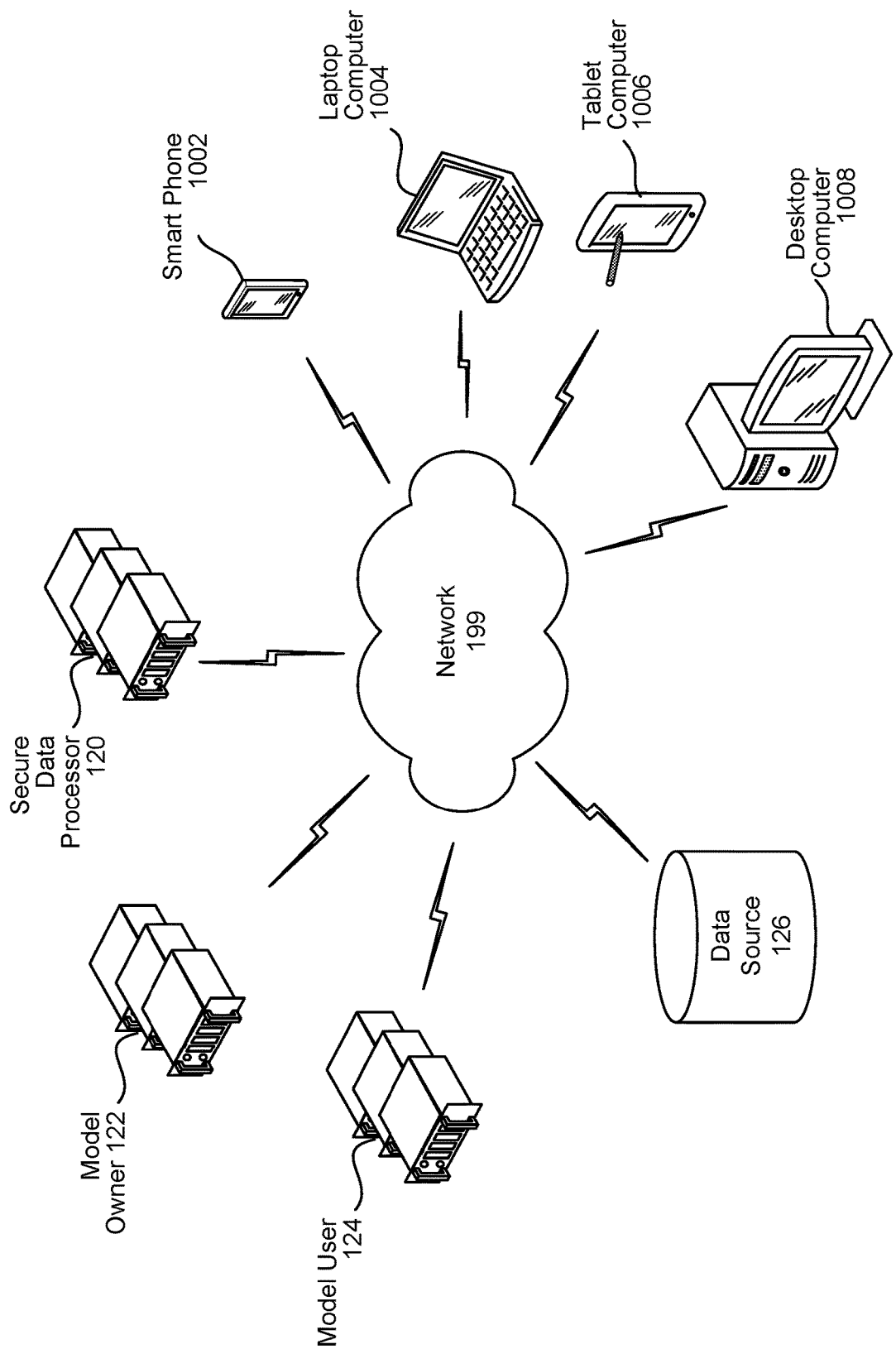
FIG. 10 is a conceptual diagram of a network according to embodiments of the present disclosure.

FIG. 10 illustrates a number of devices in communication with the secure data processor 120, model provider 122, model user 124, and/or data source 126 using the network 199. The devices may include a smart phone 1002, a laptop computer 1004, a tablet computer 1006, and/or a desktop computer 1008. These devices may be used to remotely access the secure data processor 120, model provider 122, model user 124, and/or data source 126 to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, at a secure data processing device from a model user device, a first request to create a neural-network model;
receiving, at the secure data processing device from a data source device, first parameters of first encrypted data corresponding to model training;
receiving, at the secure data processing device from a model provider device, second parameters corresponding to computing resources of the model provider device for training of the neural-network model;
determining that the first parameters and the second parameters satisfy the first request;
receiving, at the secure data processing device from the data source device, the first encrypted data corresponding to model training, wherein the first encrypted data is encrypted with a public key provided by the model provider and wherein the model provider holds a private key corresponding to the public key;
sending, from the secure data processing device to the model provider device, the first encrypted data and a second request to create the neural-network model using the first encrypted data;
receiving, at the secure data processing device from the model provider device, the neural-network model;
determining, by the secure data processing device, that the neural-network model satisfies a quality metric; and
based at least in part on determining that the neural-network model satisfies the quality metric, sending, from the secure data processing device to the model user device, the neural-network model.

2. The computer-implemented method of claim 1, wherein the first request comprises an indication of the quality metric.

3. The computer-implemented method of claim 1, further comprising:
after determining that the first parameters and the second parameters satisfy the first request, sending, from the secure data processing device to the model user device, a third request to accept the first parameters and the second parameters; and
prior to sending the second request, receiving, at the secure data processing device from the model user device, acceptance of the third request.

4. The computer-implemented method of claim 1, wherein sending the neural-network model comprises at least one of:
sending, from the secure data processing device to the model user device, computer instructions corresponding to the neural-network model;
sending, from the secure data processing device to the model user device, neural-network weights corresponding to the neural-network model; or
sending, from the secure data processing device to the model user device, changes in the neural-network weights corresponding to the neural-network model.

5. The computer-implemented method of claim 1, further comprising:
receiving, at the secure data processing device, third parameters to train the neural-network model; and
prior to sending the second request, determining, by the secure data processing device, that the second parameters correspond to more parameters of the first request than the third parameters.

6. The computer-implemented method of claim 1, further comprising:
determining that the first parameters correspond to a first amount of input data;
determining, by the secure data processing device, that the first request includes a threshold amount of input data;
determining, by the secure data processing device, that the first amount of input data is less than the threshold amount; and
based at least in part on determining that the first amount of input data is less than the threshold amount, sending, to a second data source device, a request for second encrypted input data.

7. The computer-implemented method of claim 1, further comprising:
receiving, at a secure data processor, the first encrypted data corresponding to model training;
receiving, at the secure data processor from a second data source device associated with a second data source, second encrypted data corresponding to model training, wherein the second encrypted data is encrypted with the public key provided by the model provider;
determining, using the secure data processor, encrypted summation training data by summing the first encrypted data and the second encrypted data; and
sending, by the secure data processor, the encrypted summation training data to the model provider device.

8. The computer-implemented method of claim 1, further comprising:
determining, by the model provider device, output data based at least in part on operating the neural-network model using the first encrypted data corresponding to model training; and
determining, by the model provider device, a change in the neural-network based at least in part on the output data.

9. A secure data processing system comprising:
at least one processor; and
at least one memory including instructions that, when executed by the at least one processor, cause the system to:
receive, from a model user device, a first request to create a neural-network model;
receive, from a data source device, first parameters of first encrypted data corresponding to model training;
receive, from a model provider device, second parameters corresponding to computing resources of the model provider device for training of the neural-network model;
determine that the first parameters and the second parameters satisfy the first request;
receive, from the data source device, the first encrypted data corresponding to model training, wherein the first encrypted data is encrypted with a public key provided by the model provider and wherein the model provider holds a private key corresponding to the public key;
send, to the model provider device, the first encrypted data and a second request to create the neural-network model using the first encrypted data;
receive, from the model provider device, the neural-network model;
determine that the neural-network model satisfies a quality metric; and
based at least in part on determining that the neural-network model satisfies the quality metric, send, to the model user device, the neural-network model.

10. The system of claim 9, wherein the first request comprises an indication of the quality metric.

11. The system of claim 9, wherein the at least one memory further comprises instructions that, when executed by the at least one processor, further cause the system to:
after determining that the first parameters and the second parameters satisfy the first request, send, to the model user device, a third request to accept the first parameters and the second parameters; and
prior to sending the second request, receive, from the model user device, acceptance of the third request.

12. The system of claim 9, wherein the at least one memory further comprises instructions that, when executed by the at least one processor, further cause the system to:
send, to the model user device, computer instructions corresponding to the neural-network model;
send, to the model user device, neural-network weights corresponding to the neural-network model; or
send, to the model user device, changes in the neural-network weights corresponding to the neural-network model.

13. The system of claim 9, wherein the at least one memory further comprises instructions that, when executed by the at least one processor, further cause the system to:
   receive third parameters to train the neural-network model; and
   prior to sending the second request, determine that the second parameters correspond to more parameters of the first request than the third parameters.

14. The system of claim 9, wherein the at least one memory further comprises instructions that, when executed by the at least one processor, further cause the system to:
   determine that the first parameters correspond to a first amount of input data;
   determine that the first request includes a threshold amount of input data;
   determine that the first amount of input data is less than the threshold amount; and
   based at least in part on determining that the first amount of input data is less than the threshold amount, send, to a second data source device, a request for second encrypted input data.

15. The system of claim 9, wherein the at least one memory further comprises instructions that, when executed by the at least one processor, further cause the system to:
   receiving, at a secure data processor, the first encrypted data corresponding to model training;
   receiving, at the secure data processor from a second data source device associated with a second data source, second encrypted data corresponding to model training, wherein the second encrypted data is encrypted with the public key provided by the model provider;
   determining, using the secure data processor, encrypted summation training data by summing the first encrypted data and the second encrypted data; and
   sending, by the secure data processor, the encrypted summation training data to the model provider device.

16. The system of claim 9, wherein the at least one memory further comprises instructions that, when executed by the at least one processor, further cause the system to:
   determine, by the model provider device, output data based at least in part on operating the neural-network model using the first encrypted data; and
   determine, by the model provider device, a change in the neural-network based at least in part on the output data.

17. The computer-implemented method of claim 1, further comprising:
   in response to determining that the first parameters and the second parameters satisfy the first request, sending, from the model provider device to the data source device, the public key.

18. The system of claim 9, wherein the at least one memory further comprises instructions that, when executed by the at least one processor, further cause the system to:
   in response to determining that the first parameters and the second parameters satisfy the first request, send, from the model provider device to the data source device, the public key.

* * * * *